US012764615B2

(12) United States Patent
Kim et al.

(10) Patent No.: US 12,764,615 B2
(45) Date of Patent: Oct. 13, 2026

(54) METHOD AND DEVICE FOR OPERATING TERMINAL IN WIRELESS COMMUNICATION SYSTEM

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 244 days.

(21) Appl. No.: 18/294,766

(22) PCT Filed: Aug. 4, 2022

(86) PCT No.: PCT/KR2022/011561
§ 371 (c)(1),
(2) Date: Feb. 2, 2024

(87) PCT Pub. No.: WO2023/014112
PCT Pub. Date: Feb. 9, 2023

(65) Prior Publication Data

US 2024/0373300 A1 Nov. 7, 2024

(30) Foreign Application Priority Data

Aug. 4, 2021 (KR) ........................ 10-2021-0102783

(51) Int. Cl.
*H04W 36/00* (2009.01)
*H04W 36/08* (2009.01)
*H04W 48/18* (2009.01)

(52) U.S. Cl.
CPC ... *H04W 36/0061* (2013.01); *H04W 36/0072* (2013.01); *H04W 36/008357* (2023.05); *H04W 36/08* (2013.01); *H04W 48/18* (2013.01)

(58) Field of Classification Search
CPC ............. H04W 36/0061; H04W 36/08; H04W 36/0072; H04W 48/18
(Continued)

(56) References Cited

U.S. PATENT DOCUMENTS 12,192,753 B2 * 1/2025 Zaus ................. H04W 36/0005
12,279,295 B2 * 4/2025 Bhaskaran ............ H04W 24/08
(Continued)

FOREIGN PATENT DOCUMENTS

EP 3846554 7/2021
KR 1020190034316 4/2019
(Continued)

OTHER PUBLICATIONS

PCT International Application No. PCT/KR2022/011561, International Search Report dated Nov. 3, 2022, 2 pages.
(Continued)

*Primary Examiner* — Peter G Solinsky
(74) *Attorney, Agent, or Firm* — LEE, HONG, DEGERMAN, KANG & WAIMEY

(57) ABSTRACT

A method of operating a central unit (CU) in a wireless communication system may comprise obtaining, by the CU, a first slice group identifier (ID) of a first terminal and slice mapping related information from a distributed unit (DU), transferring the first slice group ID and the slice mapping related information to an access and mobility management function (AMF) supporting the first slice group ID, obtaining mapping information related to a slice list supported by the first slice group for the first terminal from the AMF, and transferring the mapping information related to the slice list supported by the first slice group for the first terminal obtained from the AMF to the DU.

6 Claims, 16 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2020/0053643 | A1* | 2/2020 | Lee | H04W 48/10 |
| 2021/0084582 | A1 | 3/2021 | Li | |
| 2021/0385777 | A1* | 12/2021 | Son | H04W 48/18 |

FOREIGN PATENT DOCUMENTS

| | | |
|---|---|---|
| KR | 1020190041482 | 4/2019 |
| WO | 2020071727 | 4/2020 |
| WO | 2021093173 | 5/2021 |

OTHER PUBLICATIONS

Japan Patent Office Application No. 2024-506753, Office Action dated Jan. 21, 2025, 3 pages.
European Patent Office Application Serial No. 22853488.9, Search Report dated Jun. 10, 2025, 9 pages.

* cited by examiner

METHOD AND DEVICE FOR OPERATING TERMINAL IN WIRELESS COMMUNICATION SYSTEM

CROSS-REFERENCE TO RELATED APPLICATION(S)

This application is the National Stage filing under 35 U.S.C. 371 of International Application No. PCT/KR2022/011561, filed on Aug. 4, 2022, which claims the benefit of earlier filing date and right of priority to Korean Application No. 10-2021-0102783, filed on Aug. 4, 2021, the contents of which are all incorporated by reference herein in their entirety.

TECHNICAL FIELD

The following description relates to a wireless communication system and a method and device for operating a terminal. In addition, the following description relates to a wireless communication system and a method and device for operating a base station, and, more specifically, to a method of transferring slice group ID information when a terminal and a base station support slice based communication.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In particular, as a large number of communication devices require a large communication capacity, the enhanced mobile broadband (eMBB) communication technology, as compared to the conventional radio access technology (RAT), is being proposed. In addition, not only massive machine type communications (massive MTC), which provide a variety of services anytime and anywhere by connecting multiple devices and objects, but also a communication system considering a service/user equipment (UE) sensitive to reliability and latency is being proposed. Various technical configurations for this are being proposed.

SUMMARY

The present disclosure can provide a method and for operating a terminal in a wireless communication system.

The present disclosure can provide a method and device for operating a base station in a wireless communication system.

The present disclosure can provide a method and device for transferring slice group identifier (ID) information when a base station is composed of a central unit (CU) and a distributed unit (DU) in a wireless communication system.

The present disclosure can provide a method and device for selecting an access and mobility management function (AMF) based on slice group ID information in a wireless communication system.

The present disclosure can provide a method and device for indicating capability information about whether a terminal supports a slice in a wireless communication system.

Technical objects to be achieved in the present disclosure are not limited to what is mentioned above, and other technical objects not mentioned therein can be considered from the embodiments of the present disclosure to be described below by those skilled in the art to which a technical configuration of the present disclosure is applied.

As an example of the present disclosure, a method of operating a central unit (CU) in a wireless communication system may comprise the CU obtaining a first slice group identifier (ID) of a first terminal and slice mapping related information from a distributed unit (DU), transferring the first slice group ID and the slice mapping related information to an access and mobility management function (AMF) supporting the first slice group ID, obtaining mapping information related to a slice list supported by the first slice group for the first terminal from the AMF, and transferring the mapping information related to the slice list supported by the first slice group for the first terminal obtained from the AMF to the DU.

As an example of the present disclosure, a central unit operating in a wireless communication system may comprise at least one transceiver, at least one processor and at least one memory operatively connected to the at least one processor and configured to store instructions to enable the at least one processor to perform specific operation when executed. The specific operation may comprise obtaining a first slice group ID of a first terminal and slice mapping related information from a distributed unit (DU), transferring the first slice group ID and the slice mapping related information to an access and mobility management function (AMF) supporting the first slice group ID, obtaining mapping information related to a slice list supported by the first slice group for the first terminal from the AMF, and transferring the mapping information related to the slice list supported by the first slice group for the first terminal obtained from the AMF to the DU.

As an example of the present disclosure, a method of operating a terminal in a wireless communication system may comprise obtaining at least one slice group ID and slice mapping related information, selecting a first slice group ID and transmitting a random access preamble based on the first slice group ID, and completing registration in a network based on a random access procedure.

As an example of the present disclosure, a terminal operating in a wireless communication system comprises at least one transceiver, at least one processor and at least one memory operatively connected to the at least one processor and configured to store instructions to enable the at least one processor to perform specific operation when executed. The specific operation may comprise obtaining at least one slice group ID and slice mapping related information, selecting a first slice group ID and transmitting a random access preamble based on the first slice group ID, and completing registration in a network based on a random access procedure.

As an example of the present disclosure, a device comprising at least one memory and at least one processor functionally connected to the at least one memory. The at least one processor may control the device to obtain a first slice group ID of a first terminal and slice mapping related information from a distributed unit (DU), transfer the first slice group ID and the slice mapping related information to an access and mobility management function (AMF) supporting the first slice group ID, obtain mapping information related to a slice list supported by the first slice group for the first terminal from the AMF, and transfer the mapping information related to the slice list supported by the first slice group for the first terminal obtained from the AMF to the DU.

As an example of the present disclosure, a non-transitory computer-readable medium storing at least one instruction may comprise the at least one instruction executable by a processor. The at least one instruction may control a device to obtain a first slice group ID of a first terminal and slice mapping related information from a distributed unit (DU), transfer the first slice group ID and the slice mapping related information to an access and mobility management function (AMF) supporting the first slice group ID, obtain mapping information related to a slice list supported by the first slice group for the first terminal from the AMF, and transfer the mapping information related to the slice list supported by the first slice group for the first terminal obtained from the AMF to the DU.

In addition, the following may be commonly applied.

As an example of the present disclosure, the first slice group ID may correspond to the first slice group composed of a slice list based on a supported slice.

As an example of the present disclosure, the slice mapping related information may comprise at least one of frequency information available in the first slice group corresponding to the first slice group ID or priority information of a frequency.

As an example of the present disclosure, the DU may transmit at least one slice group ID and at least one slice mapping related information to the first terminal, the first terminal may transmit a first random access preamble corresponding to the first slice group ID including a network slice used by the first terminal among the at least one slice group ID to the DU, and the DU may recognize the first slice group ID based on the first random access preamble As an example of the present disclosure, the CU may obtain a first indicator indicating whether the first terminal has a capability for supporting a slice group related feature and indicate information about whether the first terminal has the capability for supporting the slice group related feature to the AMF As an example of the present disclosure, the first terminal may indicate terminal capability information regarding whether the first terminal supports a slice group related feature to the AMF through a non-access stratum (NAS) message. As an example of the present disclosure, the first indicator may indicate whether the first terminal supports a slice based cell reselection procedure and a slice based random access procedure.

As an example of the present disclosure, the AMF may directly determine mapping information related to the slice list supported by the first slice group for the first terminal.

As an example of the present disclosure, the AMF may transfer the first slice group ID and the slice mapping related information to a network slice selection function (NSSF), and receive and transfer mapping information related to the slice list supported by the first slice group for the first terminal determined by the NSSF to the CU.

As an example of the present disclosure, based on the first terminal transitioning to a radio resource control (RRC) idle state, the CU may transfer at least one of a first terminal-specific slice group, frequency information of the specific slice group or priority information to the first terminal.

As an example of the present disclosure, the CU may be connected to at least one DU.

The present disclosure can provide a method for operating a terminal.

The present disclosure can provide a method for operating a base station.

The present disclosure can provide a method and device for transferring slice group identifier (ID) information when a base station is composed of a central unit (CU) and a distributed unit (DU).

The present disclosure can provide a method and device for selecting an access and mobility management function (AMF) based on slice group ID information in a wireless communication system.

The present disclosure can provide a method and device for indicating capability information about whether a terminal supports a slice in a wireless communication system.

Technical objects to be achieved in the present disclosure are not limited to what is mentioned above, and other technical objects not mentioned therein can be considered from the embodiments of the present disclosure to be described below by those skilled in the art to which a technical configuration of the present disclosure is applied.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
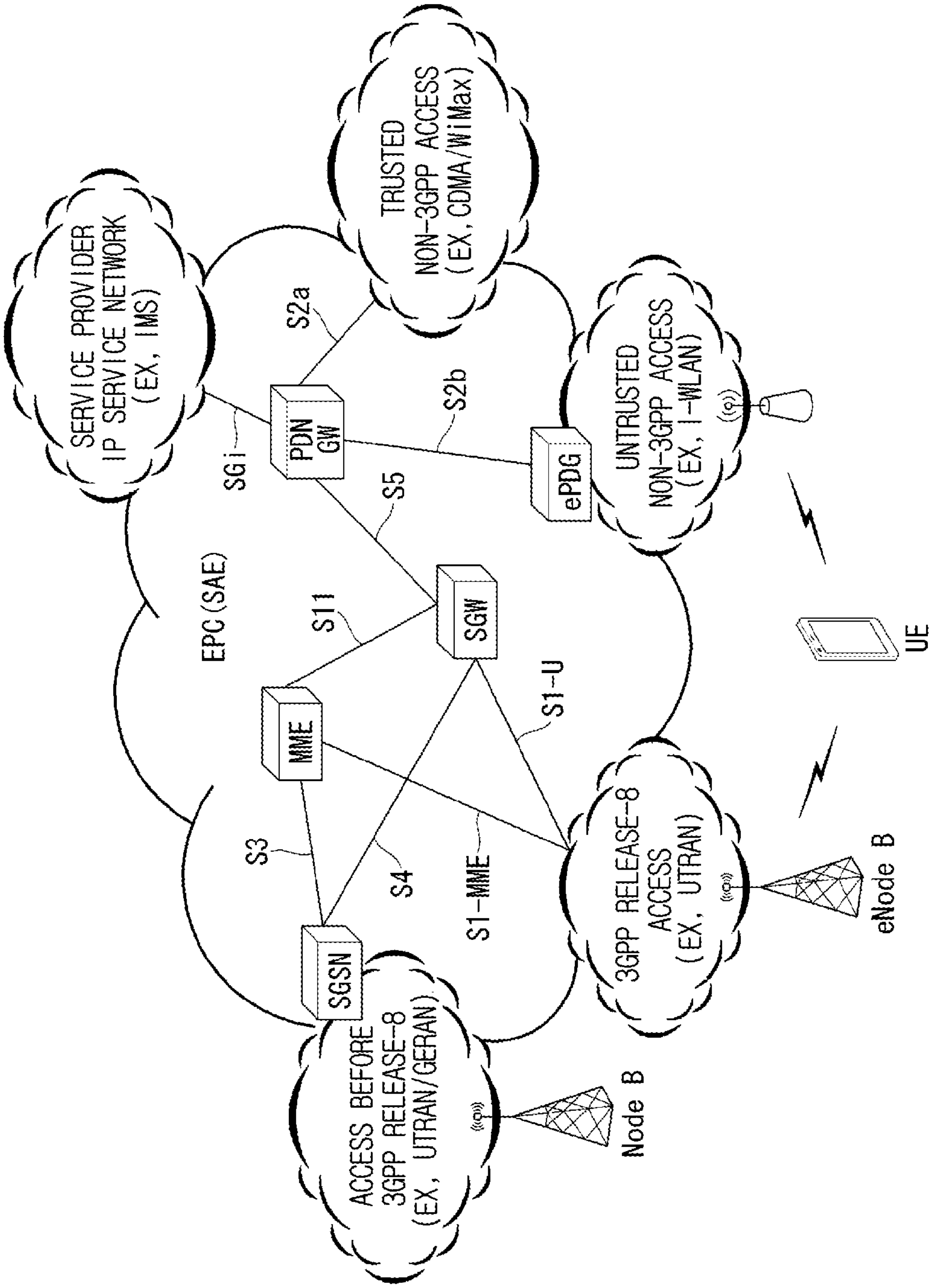
FIG. 1 is a view illustrating various reference points.

Following embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present disclosure unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In this specification, the embodiments of the present disclosure are described with focus on the relationship of data reception and transmission between a base station and a mobile station. Herein, the base station means a terminal node of a network that performs direct communication with the mobile station. In this document, a specific operation, which is described to be performed by a base station, may be performed by an upper node of the base station in some cases.

That is, in a network consisting of a plurality of network nodes including a base station, various operations for communicating with a mobile station may be performed by the base station or network nodes other than the base station. Herein, "base station" may be replaced by such terms as "fixed station", "Node B", "eNode B (eNB)", "gNode B (gNB)", "ng-eNB", "advanced base station (ABS)", or "access point".

Also, in the embodiments of the present disclosure, "terminal" may be replaced by such terms as "user equipment (UE)", "mobile station (MS)", "subscriber station (SS)", "mobile subscriber station (MSS)", "mobile terminal" or "advanced mobile station (AMS)".

In addition, a transmission end refers to a fixed and/or mobile node that provides a data service or a voice service, and a reception end means a fixed and/or mobile node that receives a data service or a voice service. Accordingly, in the case of an uplink, a mobile station may be a transmission end, and a base station may be a reception end. Likewise, in the case of a downlink, a mobile station may be a reception end, and a base station may be a transmission end.

The embodiments of the present disclosure may be supported by standard documents disclosed in at least one of the following radio access systems: an IEEE 802 xx system, a 3rd generation partnership project (3GPP) system, a 3GPP long term evolution (LTE) system, a 3GPP 5th generation (5G) new radio (NR) system and a 3GPP2 system, and in particular, the embodiments of the present disclosure may be supported by the following documents: 3GPP TS (technical specification) 38.211, 3GPP TS 38.212, 3GPP TS 38.213, 3GPP TS 38.321, and 3GPP TS 38.331.

In addition, the embodiments of the present disclosure are applicable to another radio access system but is not limited to the above-described system. As an example, they are applicable to a system applied after a 3GPP 5G NR system and are not limited to a specific system.

That is, obvious steps and parts not described in the embodiments of the present disclosure may be described with reference to the above documents. In addition, all the terms disclosed in this document may be explained by the standard document.

Hereinafter, a preferred embodiment according to the present disclosure will be described in detail with reference to accompanying drawings. Detailed descriptions disclosed below together with accompanying drawings are intended to describe example embodiments of the present disclosure and not intended to show any sole embodiment in which a technical configuration of the present disclosure can be implemented.

In addition, specific terms used in the embodiments of the present disclosure are provided to help understand the present disclosure, and such specific terms may be used in any other modified forms without departing from the technical idea of the present disclosure.

The following technology may be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like.

For clarity of explanation, the descriptions below are based on a 3GPP communication system (e.g. LTE, NR and the like), but the technical idea of the present disclosure is not limited thereto. LTE may mean a technology after 3GPP TS 36.Xxx Release 8. Specifically, the LTE technology after 3GPP TS 36.XXX Release 10 may be referred to as LTE-A, and the one after 3GPP TS 36.xxx Release 13 may be referred to as LTE-A pro. 3GPP NR may mean a technology after TS 38.xxx Release 15. 3GPP 6G may mean a technology after TS Release 17 and/or Release 18. "xxx" means the specific number of a standard document. LTE/NR/6G may be referred to collectively as 3GPP system.

Contents described in standard documents released earlier than the present disclosure may be referred to for the background art, terms and abbreviations used in the present disclosure. As an example, 36.xxx and 38.xxx standard documents may be referred to.

For terms, abbreviations, and other backgrounds that may be used in this document, reference may be made to the following standard document descriptions published prior to this document. In particular, terms, abbreviations, and other background technologies related to LTE/EPS (Evolved Packet System) may refer to 36.xxx series, 23.xxx series, and 24.xxx series, and NR (new radio)/5GS related terms and abbreviations and other backgrounds may refer to the 38.xxx series, 23.xxx series and 24.xxx series.

3GPP LTE/EPS

- 3GPP TS 36.211: Physical channels and modulation
- 3GPP TS 36.212: Multiplexing and channel coding
- 3GPP TS 36.213: Physical layer procedures
- 3GPP TS 36.214: Physical layer; Measurements
- 3GPP TS 36.300: Overall description
- 3GPP TS 36.304: User Equipment (UE) procedures in idle mode
- 3GPP TS 36.306: User Equipment (UE) radio access capabilities
- 3GPP TS 36.314: Layer 2-Measurements
- 3GPP TS 36.321: Medium Access Control (MAC) protocol
- 3GPP TS 36.322: Radio Link Control (RLC) protocol
- 3GPP TS 36.323: Packet Data Convergence Protocol (PDCP)
- 3GPP TS 36.331: Radio Resource Control (RRC) protocol
- 3GPP TS 36.413: S1 Application Protocol (S1AP)
- 3GPP TS 36.423: X2 Application Protocol (X2AP)
- 3GPPP TS 22.125: Unmanned Aerial System support in 3GPP: Stage 1
- 3GPP TS 23.303: Proximity-based services (Prose); Stage 2
- 3GPP TS 23.401: General Packet Radio Service (GPRS) enhancements for Evolved Universal Terrestrial Radio Access Network (E-UTRAN) access
- 3GPP TS 23.402: Architecture enhancements for non-3GPP accesses
- 3GPP TS 23.286: Application layer support for V2X services: Functional architecture and information flows
- 3GPP TS 24.301: Non-Access-Stratum (NAS) protocol for Evolved Packet System (EPS): Stage 3
- 3GPP TS 24.302: Access to the 3GPP Evolved Packet Core (EPC) via non-3GPP access networks: Stage 3
- 3GPP TS 24.334: Proximity-services (ProSe) User Equipment (UE) to ProSe function protocol aspects: Stage 3
- 3GPP TS 24.386: User Equipment (UE) to V2X control function: protocol aspects; Stage 3

3GPP NR/5GS

- 3GPP TS 38.211: Physical channels and modulation
- 3GPP TS 38.212: Multiplexing and channel coding
- 3GPP TS 38.213: Physical layer procedures for control
- 3GPP TS 38.214: Physical layer procedures for data
- 3GPP TS 38.215: Physical layer measurements
- 3GPP TS 38.300: NR and NG-RAN Overall Description
- 3GPP TS 38.304: User Equipment (UE) procedures in idle mode and in RRC inactive state
- 3GPP TS 38.321: Medium Access Control (MAC) protocol
- 3GPP TS 38.322: Radio Link Control (RLC) protocol
- 3GPP TS 38.323: Packet Data Convergence Protocol (PDCP)
- 3GPP TS 38.331: Radio Resource Control (RRC) protocol
- 3GPP TS 37.324: Service Data Adaptation Protocol (SDAP)
- 3GPP TS 37.340: Multi-connectivity: Overall description
- 3GPP TS 23.501: System Architecture for the 5G System
- 3GPP TS 23.502: Procedures for the 5G System
- 3GPP TS 23.503: Policy and Charging Control Framework for the 5G System: Stage 2
- 3GPP TS 24.501: Non-Access-Stratum (NAS) protocol for 5G System (5GS): Stage 3
- 3GPP TS 24.502: Access to the 3GPP 5G Core Network (5GCN) via non-3GPP access networks 3GPP TS 24.526: User Equipment (UE) policies for 5G System (5GS): Stage 3

3GPP V2X

- 3GPP TS 23.285: Architecture enhancements for V2X services
- 3GPP TR 23.786: Evolved Packet System (EPS) and the 5G System (5GS) to support advanced V2X services
- 3GPP TS 23.287: Architecture enhancements for 5G System (5GS) to support Vehicle-to-Everything (V2X) services
- 3GPP TS 24.587: Vehicle-to-Everything (V2X) services in 5G System (5GS): Protocol aspects: Stage 3
- 3GPP TS 24.588: Vehicle-to-Everything (V2X) services in 5G System (5GS): User Equipment (UE) policies: Stage 3

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use case may be focused on only one key performance indicator (KPI). 5G supports these various use cases in a flexible and reliable method.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of the existing mobile communication network structure or a clean-state structure.

The 5G system is defined based on a service, and an interaction between network functions (NFs) in an architecture for the 5G system can be represented in two ways as follows.

Reference point representation: indicates an interaction between NF services in NFs described by a point-to-point reference point (e.g., N11) between two NFs (e.g., AMF and SMF).

Service-based representation: network functions (e.g., AMF) within a control plane (CP) allow other authenticated network functions to access its services. The representation also includes a point-to-point reference point, if necessary.

Overview of 3GPP System

FIG. 1 illustrates various reference points.

An example of the network structure of FIG. 1 discloses an LTE/EPS-based network structure, and may operate with reference to matters described in standard documents published before this document. In the network structure of FIG. 1, at least one of SGW, PDN GW, MME, SGSN, and ePDG entities may operate with reference to matters described in standard documents published before this document. In addition, S1-MME, S1-U, S2a, S2b, S3, S4, S5, S11, and SGi may exist as interfaces between each entity, which are described in the standard document published before this document. can do. In addition, other entities and interfaces may be configured with reference to matters described in standard documents published before this document described above, and are not limited to specific forms.

Figure 2:
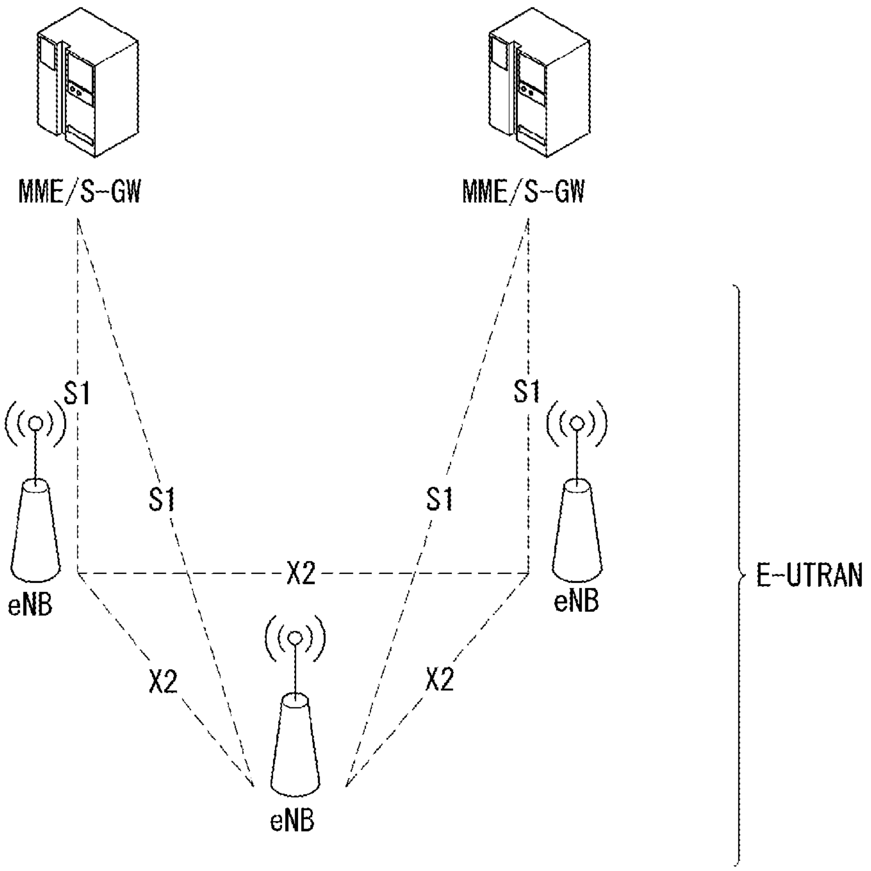
FIG. 2 is a view illustrating an example of a network structure of an evolved universal terrestrial radio access network (E-UTRAN) to which the present disclosure is applicable.

FIG. 2 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VOIP)) through IMS and packet data.

Referring to FIG. 2, an E-UMTS network includes an E-UTRAN, an EPC, and one or more UEs. The E-UTRAN consists of eNBs that provide control plane and user plane protocols to the UE, and the eNBs are interconnected with each other by means of the X2 interface, and reference may be made to matters described in standard documents published before this document.

Figure 3:
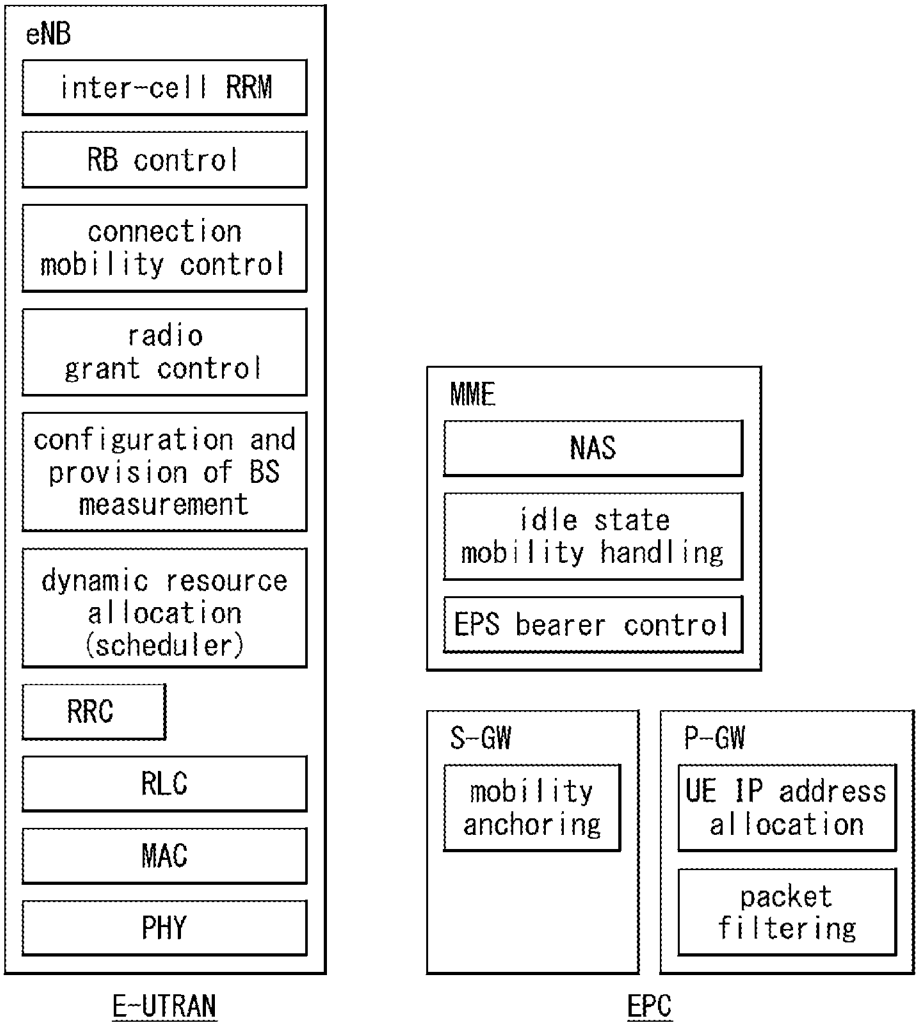
FIG. 3 is a view illustrating a general E-URTAN and an example of an architecture of an evolved packet core (EPC).

FIG. 3 is a view illustrating a general E-URTAN and an example of an architecture of an evolved packet core (EPC).

As illustrated in FIG. 3, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging situation in the EPC, management of an LTE IDLE state, ciphering of a user plane, SAE bearer control, and ciphering and integrity protection of NAS signaling.

Annex J of 3GPP TR 23.799 shows various architectures combining 5G and 4G. And 3GPP TS 23.501 shows an architecture using NR and NGC.

Figure 4:
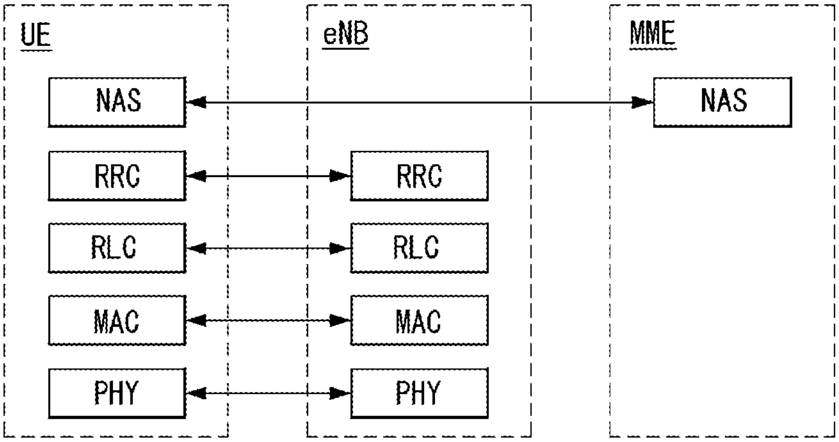
FIG. 4 is a view illustrating an example of a structure of a radio interface protocol in a control plane between user equipment (UE) and evolved node B (eNB).
Figure 5:
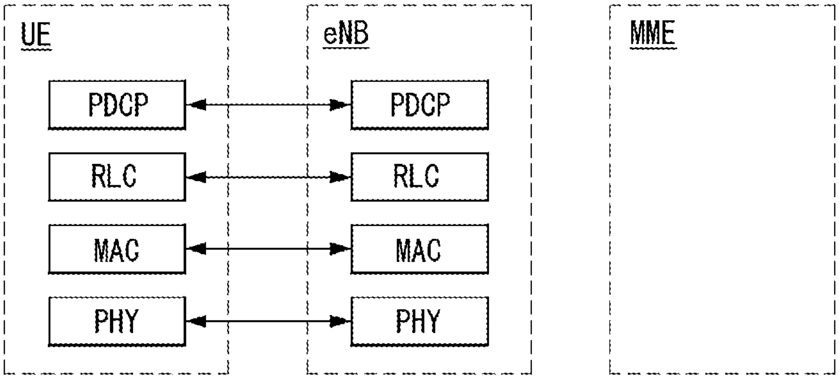
FIG. 5 is a view illustrating an example of a structure of a radio interface protocol in a user plane between UE and eNB.

FIG. 4 is a view illustrating an example of a structure of a radio interface protocol in a control plane between user equipment (UE) and evolved node B (eNB), and FIG. 5 is view illustrating an example of a structure of a radio interface protocol in a user plane between UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems, and it is possible to refer to the matters described in the standard document published before this document described above.

Figure 6:
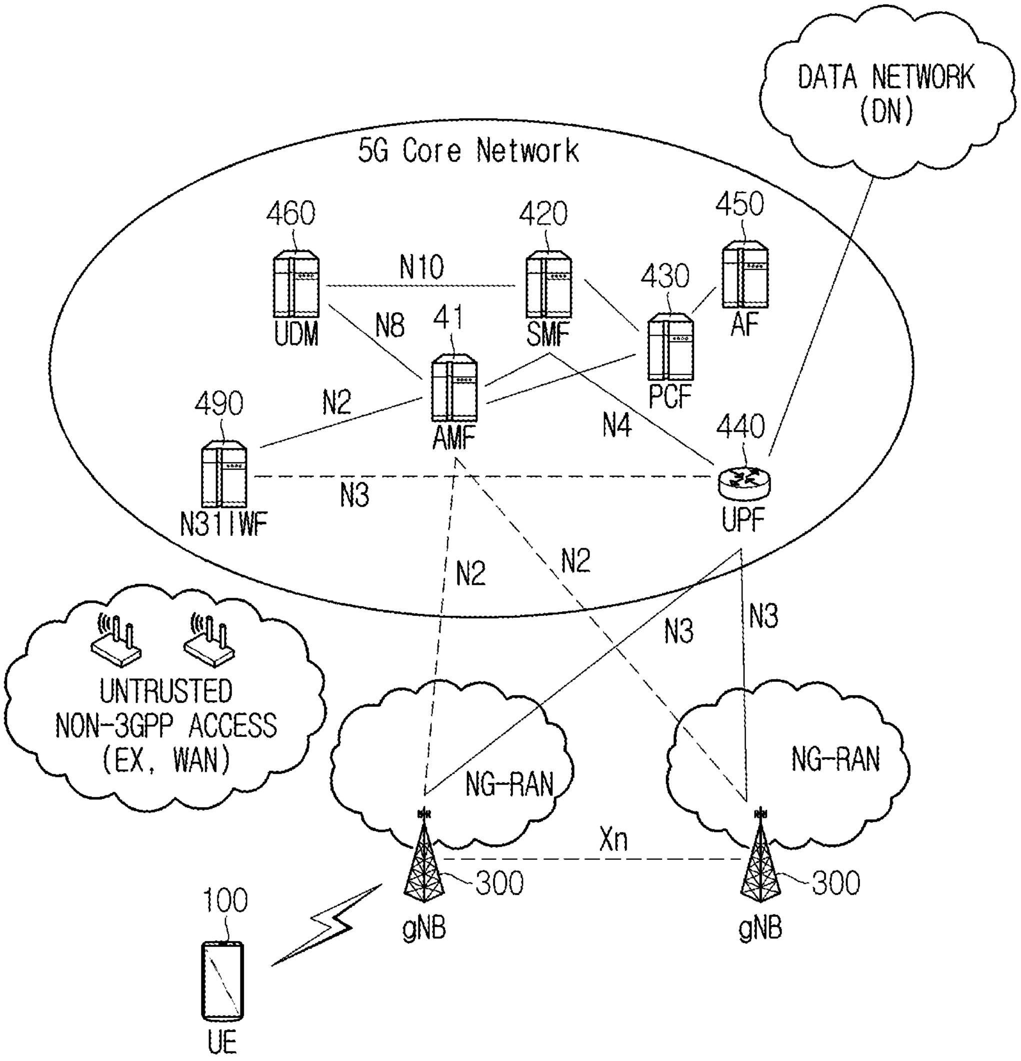
FIG. 6 is a view illustrating an example of an architecture of a general new radio (NR)-radio access network (RAN).

FIG. 6 is a view illustrating an example of a wireless communication system that is applied to the present disclosure.

5GC (5G Core) may include various components, part of which are shown in FIG. 6, including an access and mobility management function (AMF) 410, a session management function (SMF) 420, a policy control function (PCF) 430, a Prose user plane function (UPF) 440, an application function (AF) 450, unified data management (UDM) 460, and a non-3GPP interworking function (N3IWF) 490.

A UE 100 is connected to a data network via the UPF 440 through a next generation radio access network (NG-RAN) including the gNB 300. The UE 100 may be provided with a data service even through untrusted non-3GPP access, e.g., a wireless local area network (WLAN). In order to connect the non-3GPP access to a core network, the N3IWF 490 may be deployed.

The N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The AMF 410 may manage access and mobility in the 5G system. The AMF 410 may perform a function of managing (non-access stratum) NAS security. The AMF 410 may perform a function of handling mobility in an idle state.

The UPF 440 performs a function of gateway for transmitting and receiving user data. The UPF node 440 may perform the entirety or a portion of a user plane function of a serving gateway (S-GW) and a packet data network gateway (P-GW) of 4G mobile communication.

The UPF 440 is a component that operates as a boundary point between a next generation radio access network (NG-RAN) and the core network and maintains a data path between the gNB 300 and the SMF 420. In addition, when the UE 100 moves over an area served by the gNB 300, the UPF 440 serves as a mobility anchor point. The UPF 440 may perform a function of handling a PDU. For mobility within the NG-RAN (which is defined after 3GPP Release-15), the UPF 440 may route packets. In addition, the UPF 440 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 440 may correspond to a termination point of a data interface toward the data network.

The PCF 430 is a node that controls an operator's policy. The AF 450 is a server for providing various services to the UE 100. The UDM 460 is a server that manages subscriber information, such as home subscriber server (HSS) of 4G mobile communication. The UDM 460 stores and manages the subscriber information in a unified data repository (UDR).

The SMF 420 may perform a function of allocating an Internet protocol (IP) address of the UE 100. In addition, the SMF 420 may control a packet data unit (PDU) session.

For convenience of explanation, hereinafter, reference numerals may be omitted for AMF 410, SMF 420, PCF 430, UPF 440, AF 450, UDM 460, N3IWF 490, gNB 300, or UE

100, which may operate with reference to contents described in standard documents released earlier than the present document.

Figure 7:
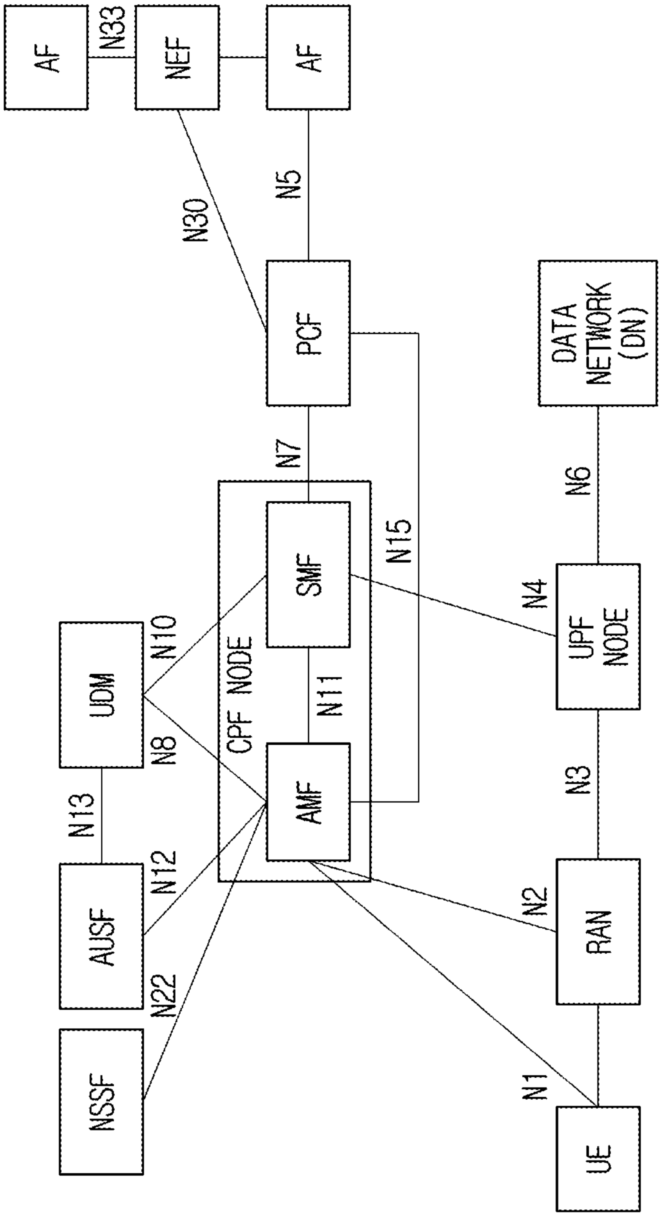
FIG. 7 is a view illustrating an example of functional separation of a general NG-RAN and a 5th generation core (5GC).

FIG. 7 is a view illustrating an example expressing a structure of a wireless communication system, which is applied to the present disclosure, from a node perspective.

Referring to FIG. 7, a UE is connected to a data network (DN) through a next generation RAN. A control plane function (CPF) node performs all or a part of the functions of a mobility management entity (MME) of 4G mobile communication and all or a part of serving gateway (S-GW) and PDN gateway (P-GW) functions. The CPF node includes AMF and SMF.

A UPF node performs a function of a gateway in which data of a user is transmitted and received.

An authentication server function (AUSF) authenticates and manages a UE. A network slice selection function (NSSF) is a node for network slicing described below.

A network exposure function (NEF) provides a mechanism that safely opens the service and function of 5G core.

Reference points in FIG. 7 are described as follows. N1 represents a reference point between UE and AMF. N2 represents a reference point between (R)AN and AMF. N3 represents a reference point between (R)AN and UPF. N4 represents a reference point between SMF and UPF. N5 represents a reference point between PCF and AF. N6 represents a reference point between UPF and DN. N7 represents a reference point between SMF and PCF. N8 represents a reference point between UDM and AMF. N9 represents a reference point between UPFs. N10 represents a reference point between UDM and SMF. N11 represents a reference point between AMF and SMF. N12 represents a reference point between AMF and AUSF. N13 represents a reference point between UDM and AUSF. N14 represents a reference point between AMFs. N15 represents a reference point between PCF and AMF in a non-roaming scenario and a reference point between AMF and PCF of a visited network in a roaming scenario. N16 represents a reference point between SMFs. N22 represents a reference point between AMF and NSSF. N30 represents a reference point between PCF and NEF. N33 may represent a reference point between AF and NEF, and the above-described entity and interface may be configured with reference to contents described in standard documents released earlier than the present document.

A radio interface protocol is based on the 3GPP radio access network standard. The radio interface protocol is horizontally divided into a physical layer, a data link layer, and a network layer, and is vertically divided into a user plane for transmission of data information and a control plane for transfer of control signal (signaling).

The protocol layers may be divided into L1 (layer-1), L2 (layer-2), and L3 (layer-3) based on the three lower layers of the open system interconnection (OSI) reference model widely known in communication systems.

Figure 8:
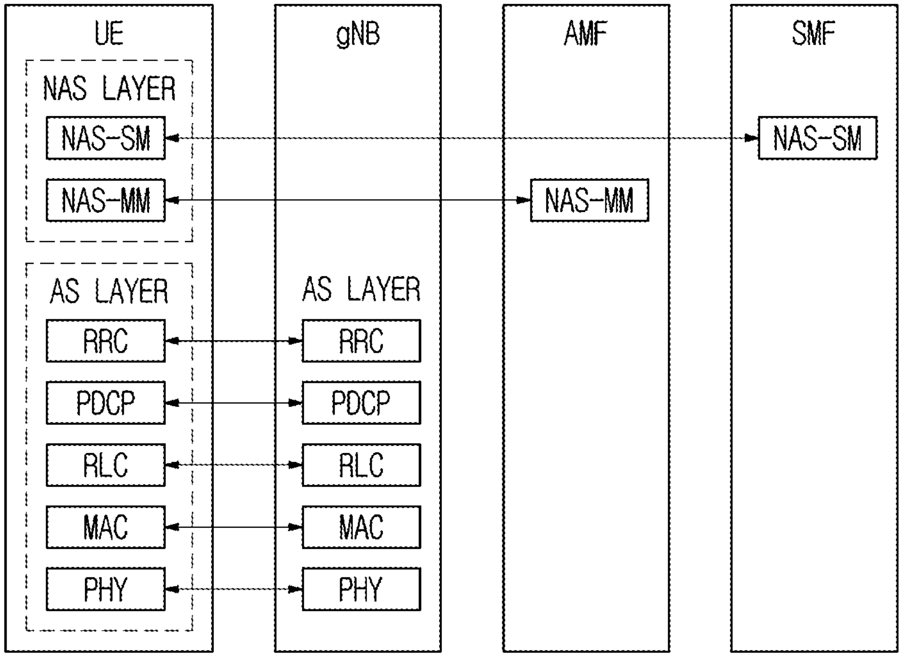
FIG. 8 is a view illustrating an example of a general architecture of a 5th generation (5G) system.

Hereinafter, the present disclosure will describe each layer of a radio protocol. FIG. 8 is a view illustrating an example of a radio interface protocol between UE and gBN.

Referring to FIG. 8, an access stratum (AS) layer may include a physical (PHY) layer, a medium access control layer, a radio link control (RLC) layer, a packet data convergence protocol (PDCP) layer, and a radio resource control (RRC) layer, and an operation based on each layer may be performed with reference to contents described standard documents released earlier than the present document.

Communication System Applicable to the Present Disclosure

Although not limited thereto, various descriptions, functions, procedures, proposals, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Communication System Applicable to the Present Disclosure

Figure 9:
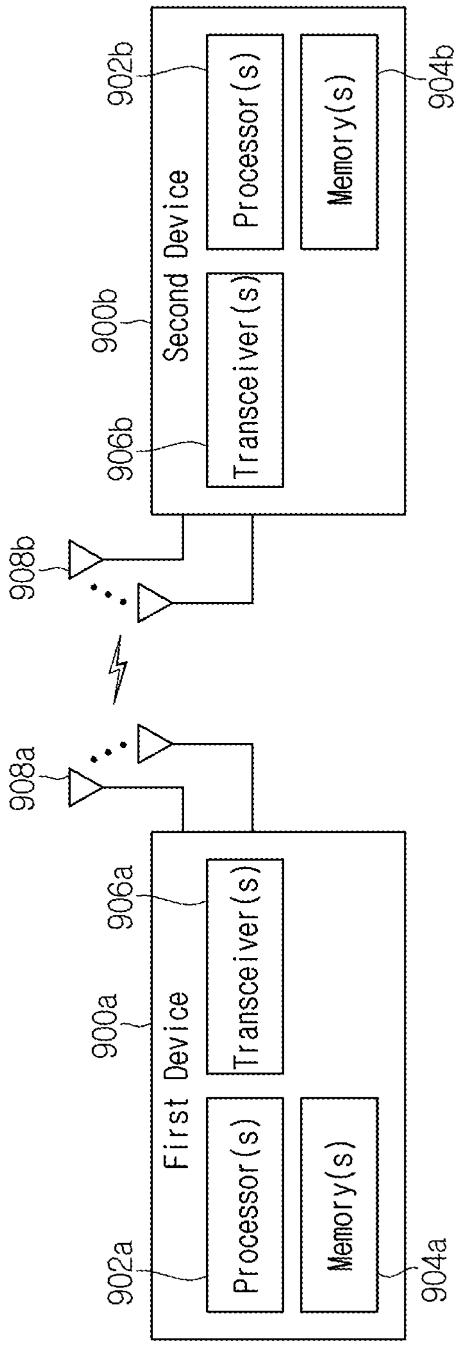
FIG. 9 is a view illustrating an example of a wireless device applicable to the present disclosure.

FIG. 9 is a view showing an example of a wireless device applicable to the present disclosure.

Referring to FIG. 9, a first wireless device 900*a* and a second wireless device 900*b* may transmit and receive radio signals through various radio access technologies (e.g., LTE or NR). Here, {the first wireless device 900*a*, the second wireless device 900*b*} may correspond to {the wireless device 100*x*, the base station 90} and/or {the wireless device 100*x*, the wireless device 100*x*}.

The first wireless device 900*a* may include one or more processors 902*a* and one or more memories 904*a* and may further include one or more transceivers 906*a* and/or one or more antennas 908*a*. The processor 902*a* may be configured to control the memory 904*a* and/or the transceiver 906*a* and to implement descriptions, functions, procedures, proposals, methods and/or operational flowcharts disclosed herein. For example, the processor 902*a* may process information in the memory 904*a* to generate first information/signal and then transmit a radio signal including the first information/signal through the transceiver 906*a*. In addition, the processor 902*a* may receive a radio signal including second information/signal through the transceiver 906*a* and then store information obtained from signal processing of the second information/signal in the memory 904*a*. The memory 904*a* may be coupled with the processor 902*a*, and store a variety of information related to operation of the processor 902*a*. For example, the memory 904*a* may store software code including instructions for performing all or some of the processes controlled by the processor 902*a* or performing the descriptions, functions, procedures, proposals, methods and/or operational flowcharts disclosed herein. Here, the processor 902*a* and the memory 904*a* may be part of a communication modem/circuit/chip designed to implement wireless communication technology (e.g., LTE or NR). The transceiver 906*a* may be coupled with the processor 902*a* to transmit and/or receive radio signals through one or more antennas 908*a*. The transceiver 906*a* may include a transmitter and/or a receiver. The transceiver 906*a* may be used interchangeably with a radio frequency (RF) unit. In the present disclosure, the wireless device may refer to a communication modem/circuit/chip.

The second wireless device 900*b* may include one or more processors 902*b* and one or more memories 904*b* and may further include one or more transceivers 906*b* and/or one or more antennas 908*b*. The processor 902*b* may be configured to control the memory 904*b* and/or the transceiver 906*b* and to implement the descriptions, functions, procedures, proposals, methods and/or operational flowcharts disclosed herein. For example, the processor 902*b* may process information in the memory 904*b* to generate third information/signal and then transmit the third information/signal through the transceiver 906*b*. In addition, the processor 902*b* may receive a radio signal including fourth information/signal through the transceiver 906*b* and then store information obtained from signal processing of the fourth information/signal in the memory 904*b*. The memory 904*b* may be coupled with the processor 902*b* to store a variety of information related to operation of the processor 902*b*. For example, the memory 904*b* may store software code including instructions for performing all or some of the processes controlled by the processor 902*b* or performing the descriptions, functions, procedures, proposals, methods and/or operational flowcharts disclosed herein. Herein, the processor 902*b* and the memory 904*b* may be part of a communication modem/circuit/chip designed to implement wireless communication technology (e.g., LTE or NR). The transceiver 906*b* may be coupled with the processor 902*b* to transmit and/or receive radio signals through one or more antennas 908*b*. The transceiver 906*b* may include a transmitter and/or a receiver. The transceiver 906*b* may be used interchangeably with a radio frequency (RF) unit. In the present disclosure, the wireless device may refer to a communication modem/circuit/chip.

In addition, the structure of a wireless device applicable to the present disclosure is not limited to FIG. 9, and may be configured in various forms. In particular, the present disclosure may be applied to a wireless device that performs an operation for transmitting and/or receiving a wireless signal, and is not limited to a specific form.

Figure 10:
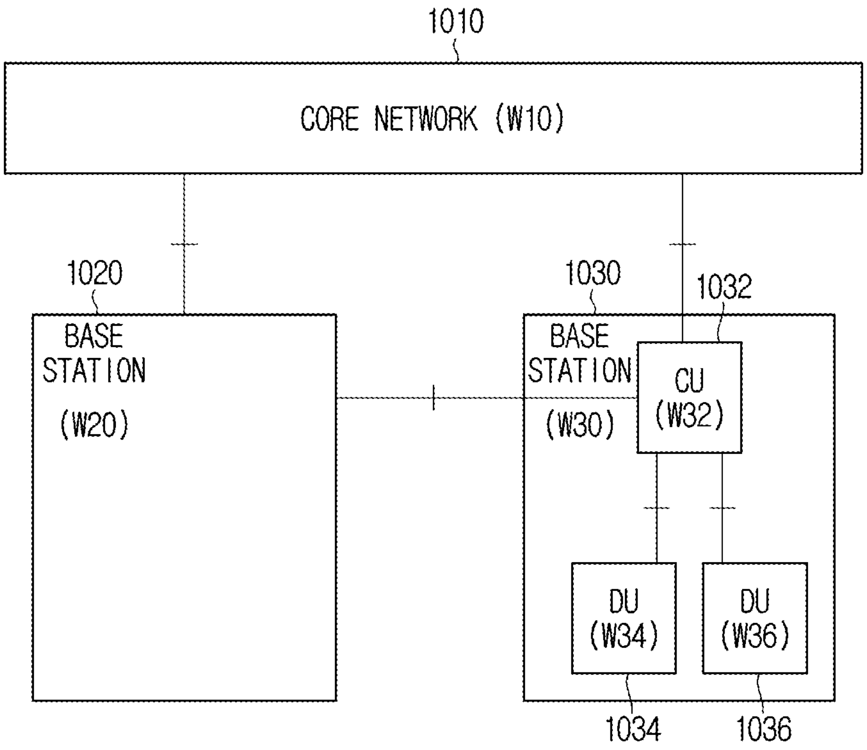
FIG. 10 is a block diagram showing a configuration of a network node according to an embodiment of the present disclosure.

FIG. 10 is a block diagram showing a configuration of a network node according to an embodiment of the present disclosure. Referring to FIG. 10, interfaces may be configured between a core network 1010 and base stations 1020 and 1030. For example, interfaces between the base stations 1020 and 1030 and the core network 1010 may be NG, and an interface between a base station 1032 and the neighboring base station 1030 may be Xn. However, each interface may not be limited to the above-mentioned name. That is, there may be interfaces between the core network 1010 and the base stations 1020 and 1030 and between base stations, and may not be limited to a specific embodiment. As an example, the base station 1030 may be divided into a central unit (CU) 1032 and at least one distributed unit (DU) 1034, 1036. That is, the base station 1030 may be hierarchically separated and operated. The CU 1032 may be connected to one or more DUs 1034 and 1036. Here, an interface may exist between the CU 1032 and at least one DU 1032 or 1034. For example, an interface between the CU 1032 and at least one DU 1032 or 1034 may be F1, but may not be limited to the name. The CU 1032 may perform the functions of upper layers of the base station. At least one DU 1034, 1036 may perform the functions of lower layers of the base station. The CU 1032 may be a logical node that hosts the radio resource control (RRC), service data adaptation protocol (SDAP), and packet data convergence protocol (PDCP) layers of a base station (e.g., gNB). In addition, at least one DU 1034, 1036 may be a logical node that hosts the radio link control (RLC), media access control (MAC), and physical (PHY) layers of the base station. As another example, the CU 1032 may be a logical node that hosts the RRC and PDCP layers of a base station (e.g., en-gNB).

At this time, the operation of at least one DU 1034, 1036 may be partially controlled by the CU 1032. At least one DU 1034, 1036 may support one or more cells. On the other hand, one cell may be supported by only one DU 1034, 1036. At this time, as an example, at least one DU 1034, 1036 may be connected to one CU 1032. As another example, at least one DU 1034, 1036 may be connected to a plurality of CUs, and is not limited to a specific embodiment.

In addition, as an example, network slicing may be a technology that uses network virtualization technology to separate one physical network into multiple virtual networks and use them. As an example, network slicing may be a combination of network nodes with functions required to provide a specific service. The network nodes constituting a slice instance may be hardware independent nodes or logically independent nodes. Each slice instance may be composed of a combination of all nodes necessary to configure the entire network. Here, one slice instance may independently provide a service to a terminal. As another example, a slice instance may be composed of a combination of some nodes among the nodes constituting the network. Here, the slice instance does not provide the service independently to the terminal, but may provide the service in conjunction with other existing network nodes. As another example, a plurality of slice instances may provide the service to the terminal in conjunction with each other.

The slice instance differs from a dedicated core network in that the entire network node, including a core network (CN) node and a RAN, may be separated. In addition, the slice instance differ from the dedicated core network in that the network node may be logically separated. In the following, network slice and S-NSSAI (Single Network Slice Selection Assistance information) may be used interchangeably. In addition, as an example, certain steps in the following procedures may be performed simultaneously or in parallel, or may be performed in a different order.

The following drawings were prepared to explain a specific example of the present specification. Since the names of specific devices or specific signals/messages/fields described in the drawings are provided as examples, the technical features of this specification are not limited to the specific names used in the drawings below.

Also, as an example, the terminal may be set to any one of RRC connected, RRC idle, and RRC inactive. For example, the RRC connected terminal may be in a state in which an RRC connection is established based on the core network and the base station, and the RRC idle state may be a state in which the RRC connection is not maintained. Here, as an example, the RRC inactive state may be a state in which the terminal remains connected to the core network (CM-CONNECTED) but may move within the area set by the RAN (RNA) without notifying the RAN.

Here, as an example, the terminal in the inactive state may be configured by the last serving base station within the RNA (RAN-Based Notification area). RNA may include a single or multiple cells and may be included within a core network region, but may not be limited thereto. Here, when the terminal performs selection for a cell that does not belong to the RNA for which the cell reselection procedure is configured, the terminal may periodically perform RNAU (RAN-based notification area update). Here, as an example, RNA may be constructed based on Table 1 below.

TABLE 1

| |
|---|
| - Cell list: |
| - List explicitly provided to the terminal |
| - RAM area list: |

TABLE 1-continued

| |
|---|
| - The terminal is provided with (at least one) RAN area identifier (ID) (a RAN area is a subset of a CN tracking area or is identical to a CN tracking area. A RAN area is designated by one RAN area ID consisting of a TAC and optionally a RAN area code) Cell broadcasts one or more RAN area IDs in system information |

As an example, the last serving node of the RRC inactive terminal may maintain the terminal-related NG connection with the terminal context, serving AMF, and UPF. Here, when the last serving node receives DL data from the UPF or downlink-related signaling (excluding UE context release command message) from the AMF, it may page the cell corresponding to RNA and transmit XnAP RAN. Here, if the RNA includes a cell of an adjacent base station, paging may be transmitted to the adjacent base station.

In addition, as an example, when the RRC inactive terminal receives a UE context release command message, the last serving base station may page the cell corresponding to the RNA. In addition, if the RNA includes cells of neighboring base stations, paging may be transmitted to the cells of the neighboring base stations.

Also, as an example, when the RRC inactive terminal receives an NG RESET message, the last serving base station may page the cell corresponding to the RNA. In addition, if the RNA includes cells of neighboring base stations, paging may be transmitted to the cells of the neighboring base stations.

As an example, the AMF may provide core network support information to the RAN for the inactive terminal. The core network support information may include at least one of a registration area configured for the terminal, a periodic registration update timer, or a terminal identifier index value.

In addition, as an example, when the terminal accesses a base station other than the last serving base station, the other base station may trigger an XnAP UE context retrieval procedure to obtain the UE context from the last serving base station. In the case where the other base station performs UE context retrieval from the last serving base station, the other base station may perform slice recognition approval control and become a serving base station, when receiving slice information. After a path switching procedure, the serving base station may trigger a procedure for releasing the UE context at the last serving base station based on the UE context release procedure. In addition, as an example, if the RRC inactive terminal moves out of the configured RNA, the RNA update procedure may be initiated. When the base station receives an RNA update request from the terminal, the base station may trigger a procedure for obtaining UE context from the last serving base station.

Figure 11:
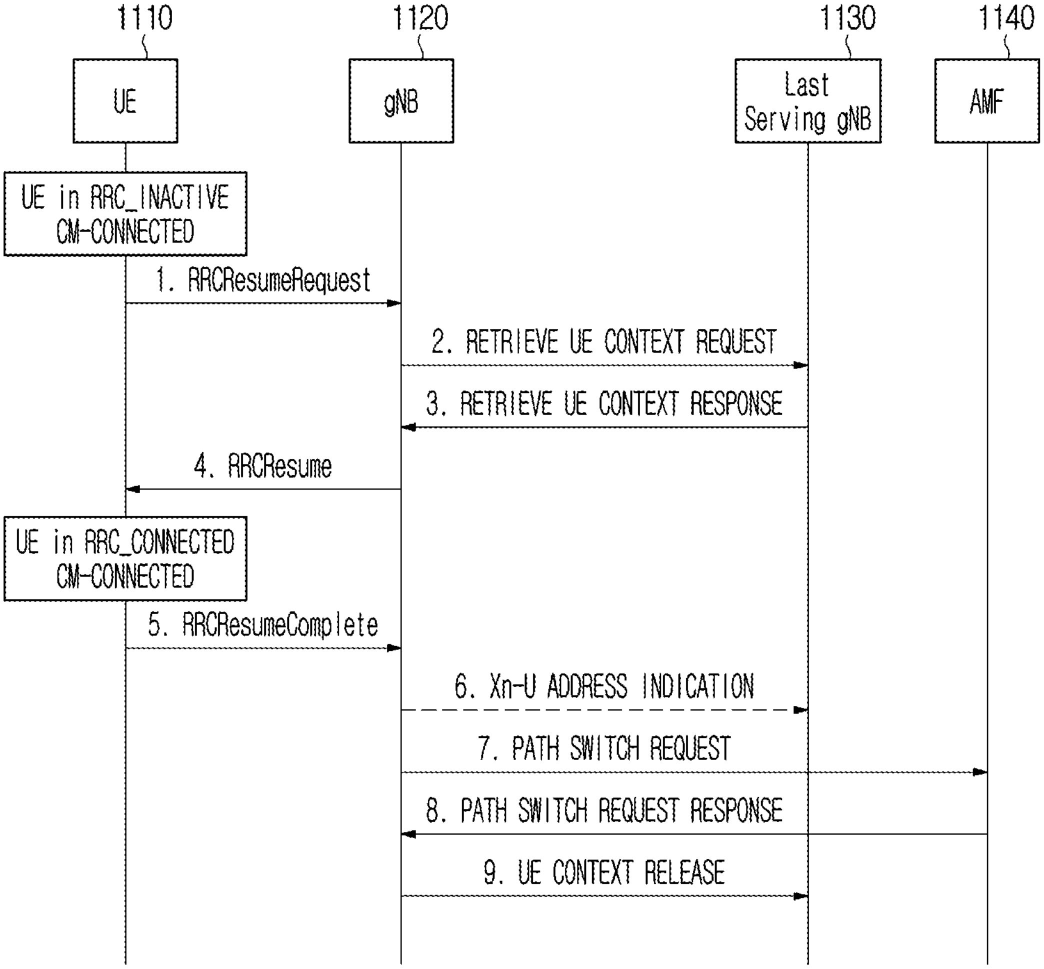
FIG. 11 is a diagram showing a method of enabling a terminal in an inactive state to transition to a connected state according to an embodiment of the present disclosure.

FIG. 11 is a diagram showing a method of enabling a terminal in an inactive state to transition to a connected state according to an embodiment of the present disclosure.

As an example, a terminal in an inactive state may transmit an RRC resume request message to a base station, but may receive an RRC rejection message based on a preset condition from the base station. At this time, the terminal in the inactive state may transition to the RRC connected state based on another base station. As another example, when the last serving base station of the terminal triggers RAN paging and the other base station receives the RAN paging, the terminal in the inactive state may transition to the RRC connected state based on the other base station. As an example, referring to FIG. 11, the terminal 1110 in the inactive state may include the I-RNTI allocated by the last serving base station in the RRC resume request message and transmit it to the base station 1120. At this time, if the base station 1120 may confirm the base station identifier included in the I-RNTI, it may request the last serving base station 1130 to provide UE context data. Through this, the base station 1120 may receive the UE context data from the last serving base station and complete the resumption of the RRC connection of the terminal 1110. In addition, as an example, the base station 1120 may provide a base station forwarding address to prevent loss of data buffered at the last serving base station 1130, and base station path switching may be performed. Afterwards, the base station 1120 may trigger release of terminal resources at the last serving base station 1130.

Figure 12:
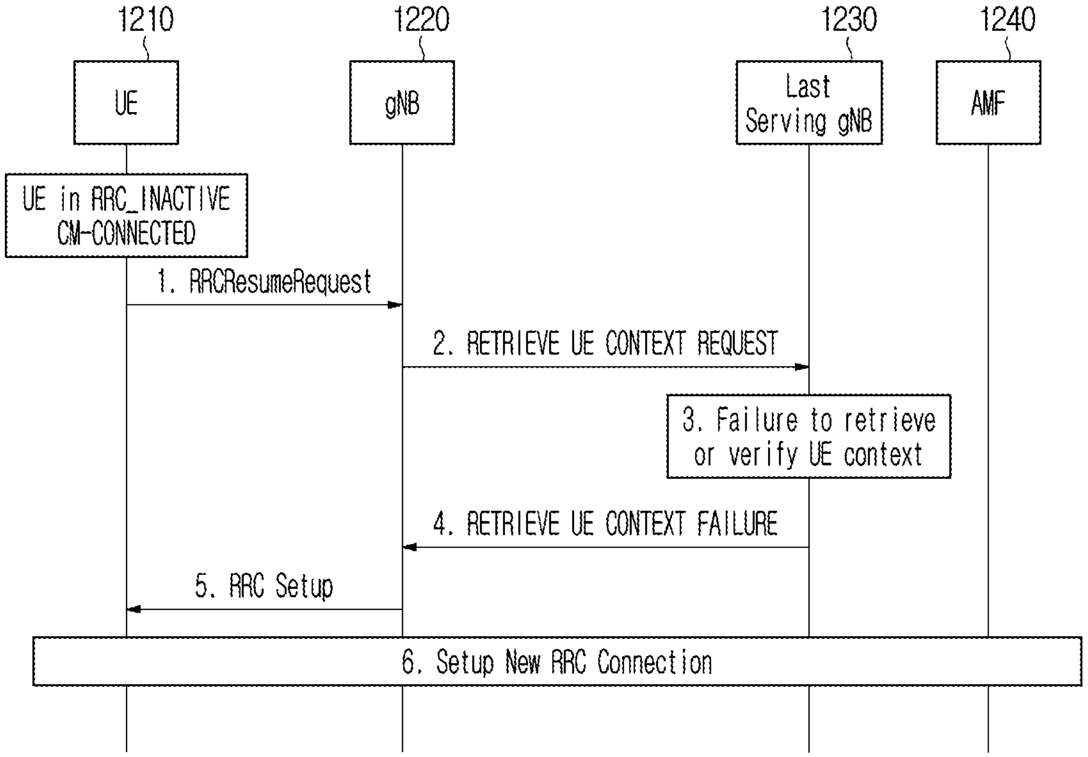
FIG. 12 is a diagram showing a method of enabling a terminal in an inactive state to transition to a connected state according to an embodiment of the present disclosure.

FIG. 12 is a diagram showing a method of enabling a terminal in an inactive state to transition to a connected state according to an embodiment of the present disclosure.

As an example, referring to FIG. 12, a terminal 1210 in an inactive state may include an I-RNTI allocated by a last serving base station in an RRC resume request message and transmit it to the base station 1220. At this time, if the base station 1220 may confirm a base station identifier included in the I-RNTI, it may request the last serving base station 1230 to provide UE context data. At this time, if the UE context is not received from the last serving base station 1230, the base station 1120 may newly perform an RRC connection with the terminal 1110 based on the failure to obtain the UE context.

Figure 13:
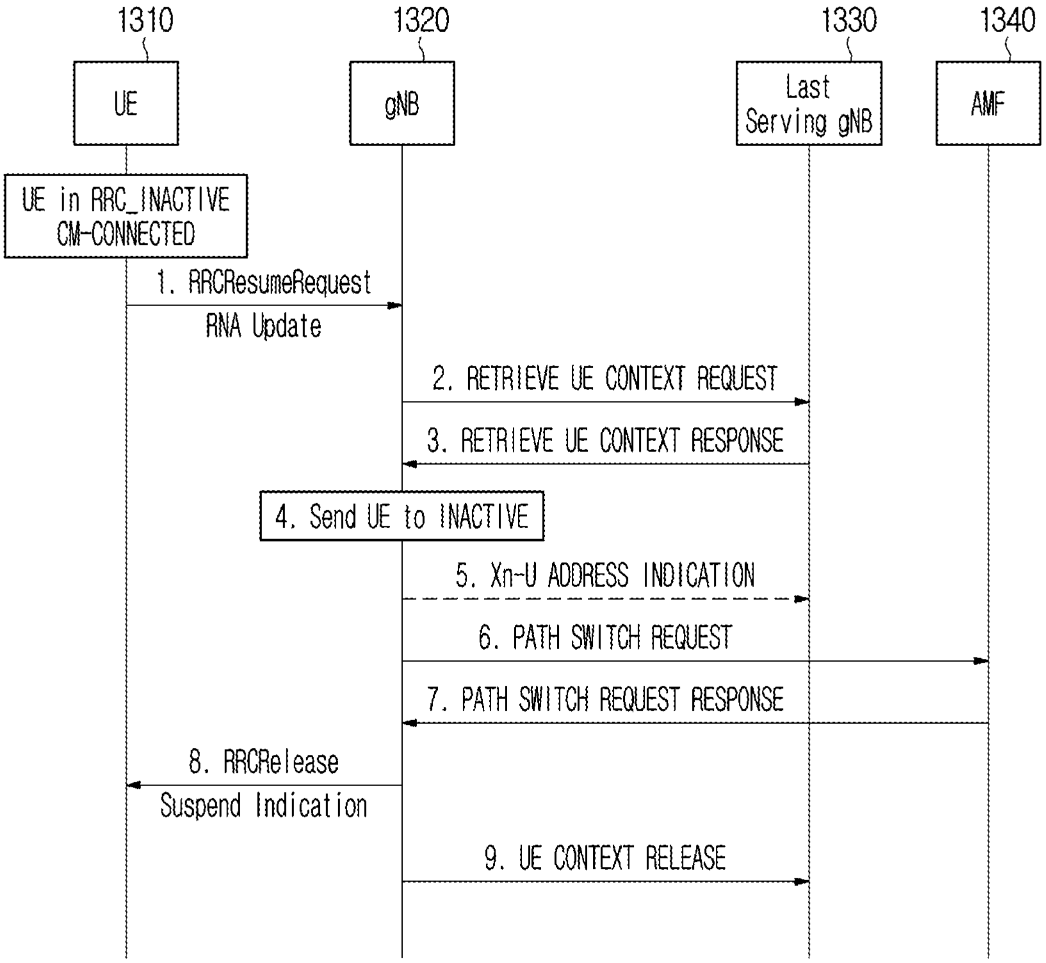
FIG. 13 is a diagram showing a method of performing a RNA update procedure according to an embodiment of the present disclosure.
Figure 14:
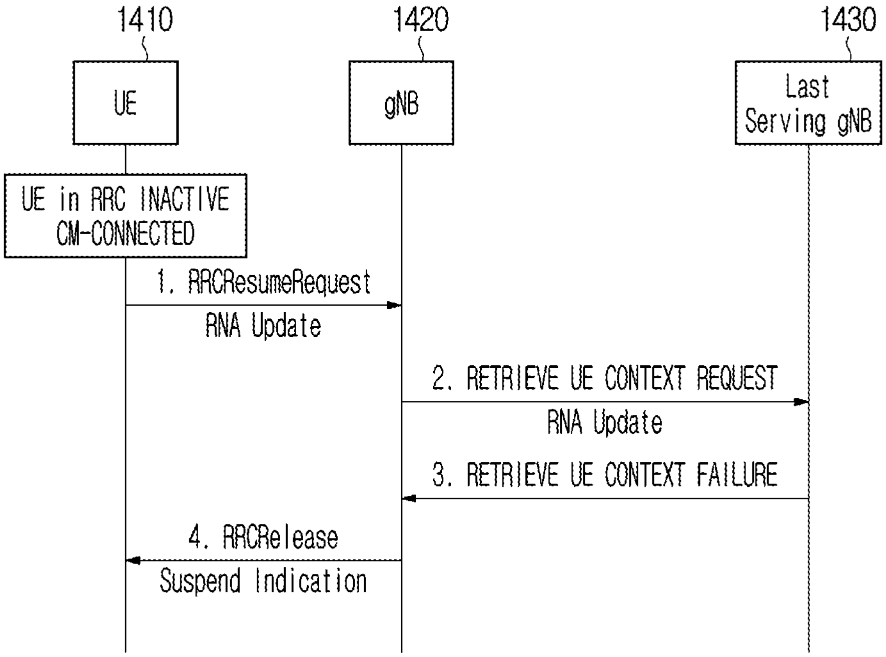
FIG. 14 is a diagram showing a method of performing a RNA update procedure according to an embodiment of the present disclosure.

FIGS. 13 and 14 are diagrams showing a method of performing an RNA update procedure according to an embodiment of the present disclosure.

As an example, an RNA update procedure may be performed based on terminal triggering. As another example, the RNA update procedure may be performed if a terminal moves out of the configured RNA. In addition, the RNA update procedure may be triggered based on a preset cycle.

As an example, referring to FIG. 13, a terminal 1310 in an inactive state may perform an RNA update along with an RRC resume request. Here, the terminal 1310 in the inactive state may perform RNA update based on an I-RNTI allocated by a last serving base station 1330 and an appropriate cause value. At this time, if the base station 1320 may confirm a base station identifier included in the I-RNTI, it may request the last serving base station 1330 to provide UE context. At this time, the base station 1320 may receive the UE context from the last serving base station 1330. Afterwards, the base station 1320 may enable the terminal to transition to the RRC connected state or the RRC idle state. In addition, as an example, the base station 1320 may provide a base station forwarding address to prevent loss of data buffered at the last serving base station 1330, and base station path switching may be performed. At this time, as an example, the base station 1320 may maintain the RRC inactive state by transmitting RRC release to the terminal, but is not limited to a specific embodiment. Afterwards, the base station 1320 may trigger release of terminal resources at the last serving base station 1330.

As an example, referring to FIG. 14, a terminal 1410 in an inactive state may transmit an RRC resume request message with an I-RNTI allocated by a last serving base station and an RNA update to a base station 1420. At this time, if the base station 1420 may confirm a base station identifier included in the I-RNTI, it may request the last serving base station 1430 to provide UE context data. At this time, if the UE context is not received from the last serving base station 1430, the base station 1420 may release the RRC connection with the terminal 1410 based on failure to acquire the UE context, and the terminal in the inactive state may state-transition based on the above. Based on the above, the terminal in the inactive state may state-transition or perform an RNA update procedure.

As an example, a method of providing slice group information based on network slicing will be described below. In order to support a feature related to a slice group, the AMF may allocate mapping information of a slice group and a slice list supporting the slice differently per terminal. For the above-described operation, the AMF needs to recognize a slice group ID that may be supported for each tracking area (TA) and a slice list that supports the slice group ID. In addition, the RAN also needs to recognize mapping information of the slice group allocated by the AMF per terminal and the slice list supporting the slice. For example, if the RAN does not recognize the mapping information of the slice group allocated by the AMF per terminal and the slice list supporting the slice, the RAN may transfer an RRC message including information that does not suit the mapping information to the terminal. As a specific example, if the RAN does not recognize the mapping information of the slice group allocated by the AMF per terminal and the slice list supporting the slice, the RAN may include an incorrect slice group, frequency band for the slice group and priority information in an RRC release message and delivering it to the terminal, such that the terminal may recognize incorrect information. Taking the above-mentioned points into consideration, a method of providing mapping information of a slice group and a slice list supporting the slice group will be described below. In particular, considering the case where the base station operates separately based on the CU-DU structure, a method of providing mapping information of a slice group and a slice list supporting the slice group to the terminal will be described.

As an example, the terminal may perform a slice-based RACH procedure. The terminal may perform a slice specific RACH procedure. When the terminal performs the slice-based RACH procedure, a slice-based RACH configuration may be set in the terminal. As an example, a separate physical random access channel (PRACH) configuration may be set based on the slice-based RACH configuration. That is, specific transmission occasions and preambles in the time domain for PRACH transmission may be set separately for a slice or slice group. In addition, as an example, the priorities of RACH parameters (e.g., scalingFactorBI, powerRampingStepHighPriority) may be configured for a slice or slice group. In addition, how the slice-based RACH procedure is associated with current functions including RACH type selection (e.g., 2-step and 4-step), RACH fallback case, legacy RA priority (e.g., MPS and MCS UEs) and other configurations may be determined and is not limited to a specific embodiment.

Here, as an example, when the terminal performs a registration procedure in the network, the terminal may include requested NSSAI in an RRC setup complete message transmitted after performing the RACH procedure based on the operator's policy or the internal configuration of the terminal and transmit it to the RAN. Here, if the requested NSSAI is not included in the RRC setup complete message, the RAN may route the terminal to the default AMF. That is, since the RAN cannot recognize specific slice information through the RRC setup complete message, it may route the terminal to the default AMF. Here, a case where the default AMF is not appropriate for serving the terminal as the AMF may be considered. For example, the AMF may not be appropriate for serving the terminal based on the terminal's mobility or traffic, and is not limited to a specific embodiment.

Here, if the AMF is not appropriate for serving the terminal, the AMF may change the path to a new AMF (re-direction). Therefore, since the terminal may receive the service after moving from the allocated AMF to the new AMF, there may be a time delay until the service is received. In addition, since signaling may be required for the above-described operation, unnecessary signaling may occur. Considering the above, if the RAN may recognize a specific slice based on the slice-specific RACH procedure, the terminal may be properly routed to the appropriate AMF regardless of whether the requested NSSAI is included in the RRC setup complete message. That is, if both the terminal and the RAN support a feature related to the slice group (i.e., slice specific cell reselection, slice specific RACH), the DU of the RAN may recognize a slice group to be used by the terminal through a random access (RA) preamble selected by the terminal in advance. Here, the DU of the RAN may recognize the above-described feature through the DU, and through this, may select an appropriate AMF to serve the terminal. That is, when the RAN selects an AMF to serve the terminal, the RAN may utilize the feature related to the slice group, which may help select an appropriate AMF to serve the terminal. In the following, in consideration of the above-mentioned points, a method of transferring the slice group ID selected by the terminal from the DU of the RAN to the CU of the RAN will be described.

As another example, the terminal may perform slice-based cell reselection. Here, for cell slice-based cell reselection, the current cell or neighboring cells may provide slice information (slice info) of supported slices and cell reselection priority information for each slice to the terminal through a system information message. As another example, the terminal may receive the above-described information through an RRC release message, and is not limited to a specific embodiment. In addition, as an example, the RAN may transmit, to the terminal, an RRC release message that causes the terminal to transition to the RRC-IDLE state. At this time, the RRC release message may include at least one of a terminal-specific slice group, frequency information of the slice group, or priority information. Here, NSSF (or AMF) may allocate mapping between slice group ID and S-NSSAI which differ per terminal. At this time, if the RAN does not recognize the above-described information, the RAN may provide the terminal with an incorrect slice group, frequency information of the slice group, and priority information. Taking the above-mentioned points into consideration, a method of, at the NSSF (or AMF), allocating mapping between slice group ID and S-NSSAI which differ per terminal and transferring it to the RAN will be described below.

Hereinafter, a method of transferring a slice group ID selected by a terminal from a DU of a RAN to a CU of the RAN and enabling an NSSF (or AMF) to allocate mapping between slice group ID and S-NSSAI which differ and to transfer it to the RAN will be described. As an example, the terminal needs to search for the RAN that supports the slice to be used by the terminal. Therefore, the terminal needs to obtain information about the slice supported by the RAN. As an example, slice information supported by the RAN may be transmitted to the terminal through system information. However, when slice information supported by the RAN is broadcast as system information, the slice information supported by the RAN may be exposed. Considering the above, the RAN may include a slice group ID in system information and broadcast it. Here, the slice group may include at least one slice that may be supported, and the slice group ID may be included in the system information as ID information of the slice group. Here, the mapping relationship of at least one slice mapped to a slice group may be transferred from the AMF to the terminal based on NAS signaling. That is, the terminal may check the slice group ID through broadcasted system information and recognize slice information mapped to the slice group based on NAS signaling. In addition, the system information may further include frequency information available in the corresponding slice group ID and priority information of the frequency. The terminal may receive system information and check the slice group ID that includes the slice to be used by the terminal. At this time, the terminal may select and transmit a random access preamble corresponding to the slice group ID.

Figure 15:
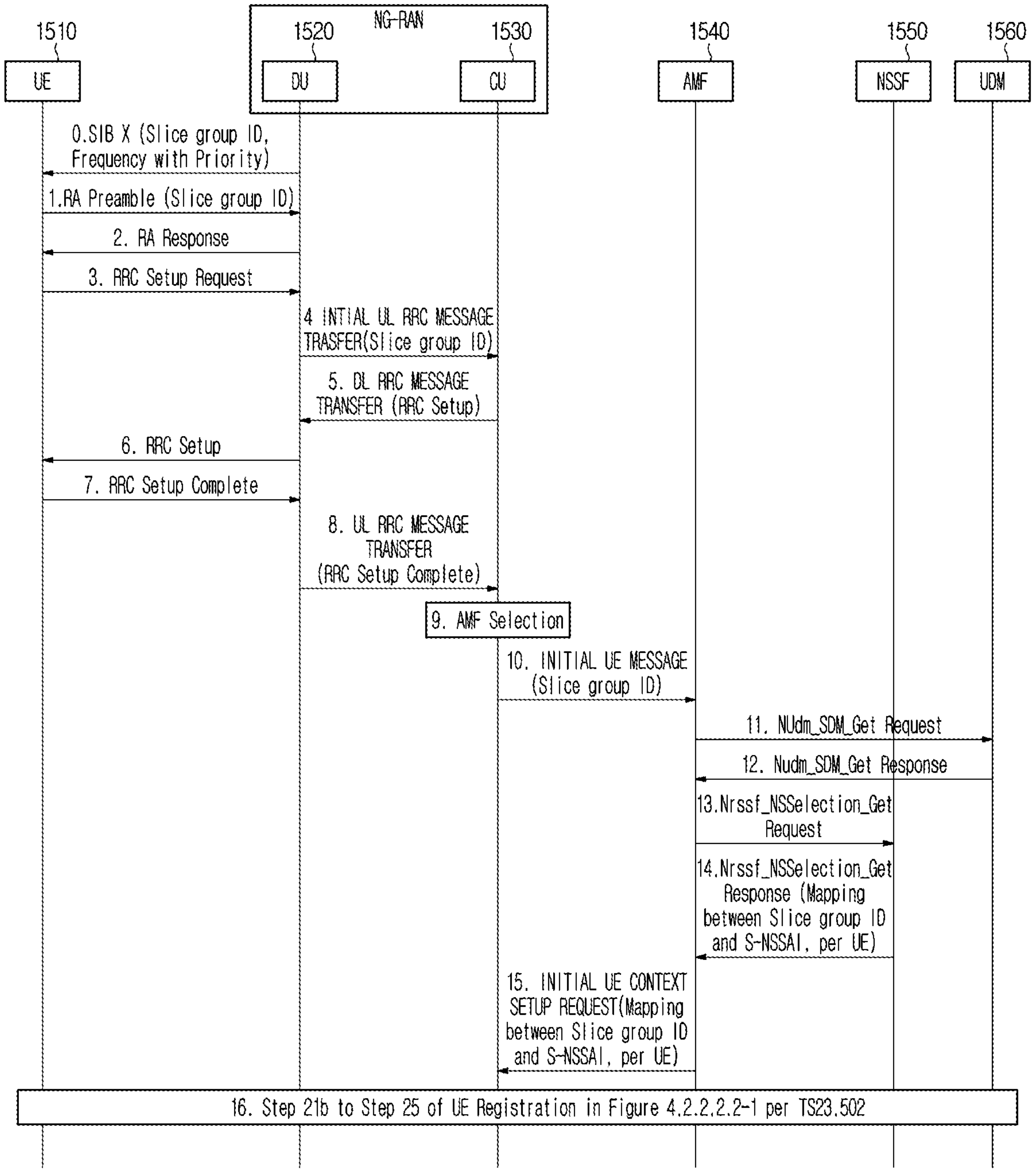
FIG. 15 shows a method of, at a DU of a RAN, transferring a slice group identifier (ID) selected by a terminal to a CU of the RAN and, at an NSSF (or AMF), allocating and transferring different slice group IDs and S-NSSAI mapping to the RAN according to an embodiment of the present disclosure.

As an example, FIG. 15 shows a method of, at a DU of a RAN, transferring a slice group ID selected by a terminal to a CU of the RAN and, at an NSSF (or AMF), allocating and transferring mapping between slice group IDs and S-NSSAI which differ to the RAN according to an embodiment of the present disclosure. Here, some new messages may be defined and used in messages (e.g., N2 messages) based on the interface between the AMF and the RAN, but are not limited to a specific embodiment. In addition, as an example, some new RRC messages may be used in the RRC messages between the RAN and the terminal below, but are not limited to a specific embodiment.

Referring to FIG. 15, the DU 1520 of the RAN may transfer a slice group ID and frequency information available in the slice group ID and priority information of the frequency to the terminal 1510 through system information. Here, the system information may be SIB X (e.g., 1, . . . , 4, . . . , 10, . . . ) or a new SIB and is not limited to the above-described embodiment.

Here, mapping relationship information between the above-described slice group ID and S-NSSAI, information about the frequency at which each slice group ID may be used, and other information are configured in advance in the CU 1530 of the RAN, the AMF 1540 and the NSSF 1550, but may not be limited to the embodiment. For example, if the mapping relationship information between the slice group ID and S-NSSAI, information about the frequency at which each slice group ID may be used, and other information are configured in the CU 1530 of the RAN, the system information (e.g., SIB X) may be encoded in the CU 1530 of the RAN and transferred to the DU 1520 of the RAN through an interface (e.g., F1 interface). That is, the DU 1520 of the RAN may receive mapping relationship information between the slice group ID and S-NSSAI, information about the frequency at which each slice group ID may be used, and other information from the CU 1530 of the RAN based on the above. As another example, in the DU 1520 of the RAN, mapping relationship information between the slice group ID and S-NSSAI, information about the frequency at which each slice group ID may be used, and other information may be configured in advance.

Based on the above, the DU 1520 of the RAN may transfer, to the terminal 1510, information about the mapping relationship between the slice group ID and S-NSSAI and the frequency, at which each slice group ID may be used, through system information.

Here, the case where the mapping relationship information between the slice group ID and S-NSSAI, information about the frequency at which each slice group ID may be used, and other information are configured only in the RAN, and are not configured in the AMF 1540, and the NSSF 1550 and other network functions may be considered. At this time, the CU 1530 of the RAN transfers the above-described information to the AMF 1540 through at least one of NG setup, AMF configuration update, RAN configuration update, and other procedures. The AMF 1540 may use the information to directly determine the mapping relationship between the slice group ID and S-NSSAI for the terminal. As another example, the AMF 1540 may transfer the information received from the RAN to the NSSF 1550 so that the NSSF 1550 may directly determine the mapping relationship between the slice group ID and S-NSSAI for the UE using the information, through which the above-mentioned information may be recognized.

In addition, as an example, the DU 1520 of the RAN may transfer a slice-specific RACH resource list available in the DU 1520 to the CU 1530 of the RAN through at least one of F1 setup, configuration update, or other procedures. As an example, the CU 1530 of the RAN may share the above-described information with another RAN through at least one of Xn setup or other procedures. Through this, the CU 1530 of the RAN may perform adjustment so that slice-specific RACH resources do not collide with the neighboring RAN.

Afterwards, the terminal 1510 may start a registration procedure to receive services from the network. Here, as an example, the terminal 1510 may previously receive mapping information between the slice group ID and S-NSSAI from the network. As another example, the terminal 1510 may configure the mapping information between the slice group ID and S-NSSAI in advance within the terminal, and is not limited to a specific embodiment. The terminal 1510 may refer to the above-described information and the contents of the system information (e.g., SIB X) and determine the slice group ID including the S-NSSAI to be served from the network to the terminal 1510. The terminal 1510 may select a RACH resource related to the determined slice group ID and transmit a random access preamble message to the DU 1520 of the RAN.

For example, if the mapping information between the slice group ID and S-NSSAI do not exist in the terminal, the terminal may transmit a random access preamble message to the DU 1520 of the RAN using existing RACH resources.

When the DU 1520 of the RAN receives a random access preamble message from the terminal 1510, the DU 1520 of the RAN may allocate related resources so that the terminal 1510 transmits an RRC setup request message, include it in a random access response, and transmit it to the terminal 1510. Here, when the terminal 1510 transmits a random access preamble message using the RACH resource related to a specific slice group ID, the DU 1520 of the RAN may recognize the slice group ID to be used by the terminal 1510. The terminal 1510 may generate an RRC setup request message according to the received random access response message and transfer it to the DU 1520 of the RAN.

Afterwards, the DU 1520 of the RAN may transfer the slice group ID to the CU 1530 of the RAN based on the RACH resource related to the specific slice group ID. As a specific example, the DU 1520 of the RAN may include the RRC setup request message transferred by the terminal 1510 in an INITIAL UL RRC MESSAGE TRANSFER and transmit it to the CU 1530 of the RAN. When the terminal 1510 transmits a random access preamble message using the RACH resource associated with the specific slice group ID, the DU 1520 of the RAN may transfer the slice group ID information in the INITIAL UL RRC MESSAGE TRANSFER. As an example, the DU 1520 of the RAN may include the slice group ID information in an UL RRC MESSAGE TRANSFER transferred after completing RRC setup and transfer it to the CU 1530 of the RAN, and is not limited to a specific embodiment.

Afterwards, the CU 1530 of the RAN may generate an RRC setup message and transfer it to the DU 1520 of the RAN using a DL RRC MESSAGE TRANSFER message. As an example, when the DU 1520 of the RAN includes the slice group ID information selected by the terminal 1510 in an INITIAL UL RRC MESSAGE TRANSFER and transmits it to the CU 1530 of the RAN, the CU 1530 of the RAN may recognize a slice group including slices to be currently used by the terminal 1510. In addition, it can be seen that the CU 1530 of the RAN may support a slice group-related feature (i.e., slice specific cell reselection, slice specific RACH) of the current terminal 1510. As an example, the terminal 1510 may add and transmit a separate indicator indicating that it may support a slice group-related feature (i.e., slice specific cell reselection, slice specific RACH) to and in the RRC message. That is, the DU 1520 of the RAN may receive a separate indicator indicating that it may support a slice group-related feature (i.e., slice specific cell reselection, slice specific RACH) from the terminal 1510, and transfers it to the CU 1530 of the RAN. Afterwards, the CU 1530 of the RAN may transfer the above-described information to the AMF 1540. Here, the DU 1520 of the RAN may transmit the RRC message (e.g., DL RRC MESSAGE TRANSFER) received from the CU 1530 of the RAN to the terminal 1510.

Afterwards, the terminal 1510 may generate a registration request message transmitted to the AMF 1540, includes it in an RRC setup complete message, and transmits it to the DU 1520 of the RAN. For example, depending on the operator policy or the internal configuration of the terminal 1510, the requested NSSAI may not be included in the RRC message, as described above. Afterwards, the DU 1520 of the RAN transfers the RRC message received from the terminal 1510 to the CU 1530 of the RAN using an UL RRC MESSAGE TRANSFER. As an example, it may be possible for slice group ID information to be included in UL RRC MESSAGE TRANSFER, as described above. Afterwards, the CU 1530 of the RAN may select the AMF 1540 to serve the terminal 1510. Here, if the terminal 1510 does not include the requested NSSAI in the RRC setup complete message based on the operator's policy or the internal configuration of the terminal 1510, the CU 1530 of the RAN may select the AMF 1540 to serve the terminal 1510 as the default AMF, as described above. However, in FIG. 15, since the CU 1530 of the RAN may recognize the slice group ID, an AMF appropriate for the terminal to receive the service without routing to the default AMF may be selected.

Specifically, the CU 1530 of the RAN may receive slice group ID information through INITIAL UL RRC MESSAGE TRANSFER after RRC setup request or UL RRC MESSAGE TRANSFER after RRC setup complete. When the CU 1530 of the RAN receives the slice group ID information, the CU 1530 of the RAN may select the AMF 1540 to serve the terminal 1510 using the slice group ID information, thereby enabling appropriate AMF selection.

At this time, as an example, the RAN and AMF 1540 may exchange a slice group ID list which may be supported by each node (i.e., RAN or AMF) and an S-NSSAI list which may be included in each slice group ID through at least one of NG setup, AMF configuration update, RAN configuration update, and other procedures. In the above-described procedure, the RAN may transfer a list of frequencies that may be supported for each slice group ID to the AMF 1540.

Afterwards, the CU 1530 of the RAN may transfer the received registration request message to the AMF 1540. Here, the CU 1530 of the RAN may also transfer the received slice group ID to the AMF 1540. The AMF 1540 may obtain information about the slice to be used by the terminal 1510 through the slice group ID in addition to the requested NSSAI.

As another example, the AMF 1540 may recognize that the terminal 1510 may support a slice group-related feature (i.e., slice specific cell reselection, slice specific RACH). In other words, the terminal may inform the network that it has the capability to support a slice-based cell reselection operation or a slice-based RACH procedure. As an example, an INITIAL UE MESSAGE including slice group ID information may be added with a separate indicator indicating that it may support a slice group-related feature (i.e., slice specific cell reselection, slice specific RACH) of the terminal 1510 and may be transmitted, and may not be limited to a specific form.

The AMF 1540 may transmit a "Nudm_SDM_Get Request" message to the UDM 1560 to determine whether to accept the registration request sent by terminal 1510. Through this, the AMF 1540 may request subscription information of the terminal 1510, and the UDM 1560 may transfer the subscription information of the terminal 1510 to the AMF 1540.

Afterwards, the AMF 1540 may transfer the requested NSSAI and subscribed S-NSSAI(s) information to the NSSF 1550, and request allowed NSSAI allocation for the terminal 1510. Here, when the AMF 1540 receives slice group ID information through an INITIAL UE MESSAGE, the AMF 1540 may transfer the slice group ID information to the NSSF 1550. Through this, the AMF 1540 may transfer to the NSSF 1550 that the terminal 1510 may support a slice group-related feature (i.e., slice specific cell reselection, slice specific RACH). In addition, the AMF 1540 may request the mapping information between slice group ID and S-NSSAI of the terminal 1510 based on the above. As an example, the above-described INITIAL UE MESSAGE may include a separate indicator indicating that the slice group-related feature (i.e., slice specific cell reselection, slice specific RACH) of the terminal 1510 may be supported, and the corresponding information may be transferred together.

The NSSF 1550 may determine the allowed NSSAI for the terminal 1510 based on the received information and transmit it to the AMF 1540. For example, when the slice group-related feature of the terminal 1510 (i.e., slice specific cell reselection, slice specific RACH) are available, the NSSF 1550 may determine mapping information between the slice group ID and S-NSSAI for the terminal 1510 and transfer it to the AMF 1540. The terminal 1510 may recognize the S-NSSAI list which may be supported by each RAN and information about the frequency band used by the S-NSSAI through the mapping information between the slice group ID and S-NSSAI for the terminal 1510. That is, the NSSF 1550 may allocate mapping between the slice group ID and S-NSSAI which differ per terminal 1510 and transfer it to the terminal 1510.

Here, when the NSSF 1550 allocates mapping between the slice group ID and S-NSSAI which differ per terminal 1510, the NSSF 1550 may consider at least one of the allowed NSSAI of the terminal 1510, the requested NSSAI or subscribed NSSAI. In addition, as an example, the NSSF 1550 further considers information such as the slice group ID list and the frequency band transmitted by the RAN in NG setup and other procedures to allocate mapping between the slice group ID and S-NSSAI which differ per terminal 1510 and is not limited to a specific embodiment. Here, as an example, according to the operator's policy, the AMF 1540 may directly determine the allowed NSSAI or the allocation information on mapping between the slice group ID and S-NSSAI for the terminal 1510, and is not limited to the above-described embodiment.

Afterwards, the AMF 1540 may notify the terminal 1510 of registration accept, and transfer, to the RAN, an initial context setup request message including a registration accept message to create a UE context in the RAN. In addition, as an example, the AMF 1540 may include and transmit the allocation information on mapping between the slice group ID and S-NSSAI in the registration accept message in order to transfer the allocation information on the determined mapping between the slice group ID and S-NSSAI to the terminal 1510.

The terminal 1510 may operate by recognizing the above-described information in the cell (re) selection and slice-specific RACH process that will occur later in the RRC idle state. That is, the terminal 1510 may perform cell (re) selection by considering the slice during the RRC idle process, and through this, select an appropriate cell. In addition, RACH resources according to slices may be used while the idle terminal transitions to an RRC-connected terminal.

In addition, as an example, the AMF 1540 may include allocation information of mapping between the slice group ID and S-NSSAI in an initial context setup request message and transmit it to the RAN. Here, the RAN may transmit an RRC release message using the allocation information of mapping between the slice group ID and S-NSSAI. That is, while the terminal 1510 transitions from the RRC connected state to the RRC idle state, the RAN may include the frequency band and priority information allocated for each slice group ID in the RRC RELEASE message and differently allocate and transfer it per terminal 1510. Afterwards, the terminal may complete final registration. As an example, the terminal may perform the remaining procedures (steps 21*b* to 25) of the registration procedure shown in FIG. 4.2.2.2.2-1 in TS 23.502, and is not limited to a specific embodiment.

In other words, the CU of the RAN may check the slice group ID including the slice to be used by the terminal through the slice-specific RACH resource selected by the terminal. Through this, the CU of the RAN may select an AMF that may serve the UE and prevent unnecessary signaling by preventing AMF re-direction. In addition, as an example, while the terminal transitions to the RRC idle state, the CU of the NG-RAN may generate and transfer the UE-specific slice group, the frequency band of the slice group and priority information. Therefore, when the UE transitions from the RRC idle state back to the RRC connected state, cell reselection may be performed by selecting a frequency band in consideration of the slice.

Figure 16:
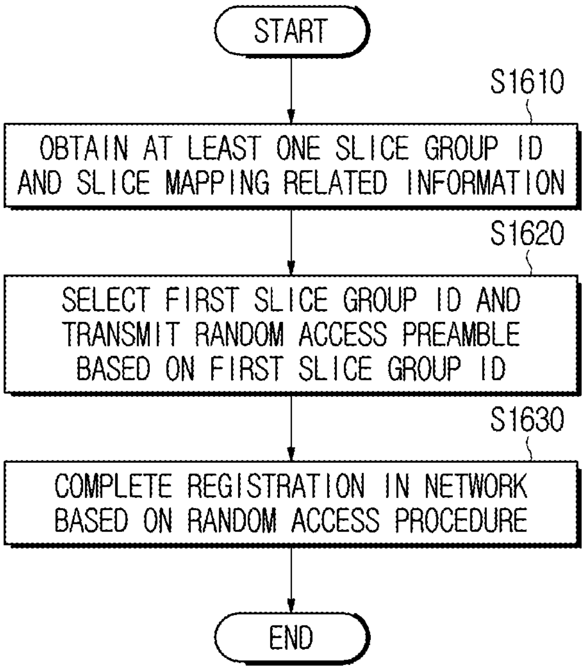
FIG. 16 is a flowchart illustrating a method of operating a terminal according to an embodiment of the present disclosure.

FIG. 16 is a flowchart illustrating a method of operating a terminal according to an embodiment of the present disclosure.

Referring to FIG. 16, the terminal may obtain at least one slice group ID and slice mapping related information (S1610). As an example, the terminal may obtain at least one slice group ID and slice mapping related information through system information. As another example, a base station may operate based on the above-described DU and CU structures, and the terminal may obtain at least one slice group ID and slice mapping related information from a DU. Here, the slice mapping related information may include at least one of a slice group ID, frequency information available in the slice group or priority information of the frequency, as described above. Here, as an example, a network slice group corresponding to the network slice group ID may include a supported network slice list. That is, supported slices may be included in each network slice group.

As an example, a slice list supported for each network slice group may be a network slice list determined for each TAC. As another example, the slice list supported for each network slice group may be a network slice list determined for each PLMN. As another example, the slice list supported for each network slice group may be a network slice list determined for each stand-alone non-public network (SNPN), and is not limited to a specific embodiment.

That is, a slice group may include a supported network slice list, and a slice group ID may be set for each slice group. As an example, the slice group may be a network slice AS group, but may not be limited to the embodiment. Here, the terminal may check the slice group that includes the slice to be used thereby among at least one slice group, and select a first slice group ID corresponding to the slice group. Afterwards, the terminal may transmit a random access preamble corresponding to the first slice group ID (S1620). At this time, as an example, the random access preamble may be a network slice-specific random access preamble. Specifically, there may be a random access preamble corresponding to each network group ID. Therefore, the base station may recognize the first slice group selected by the terminal through the slice-based random access preamble transmitted by the terminal. Afterwards, the terminal may complete registration in the network based on the random access procedure, which may be as shown in FIG. 15 described above.

Here, as an example, the RAN may transfer a slice group ID or a value corresponding to a slice group and slice mapping related information to the AMF. As an example, the RAN may transfer a slice group ID or a value corresponding to a slice group and slice mapping related information to the AMF based on an NG setup procedure or a RAN configuration update procedure, but may not be limited to this. Afterwards, the AMF may transfer the slice group ID or value corresponding to the slice group and slice mapping related information received from the RAN to the NSSF.

As a specific example, the slice group ID or value corresponding to the slice group and slice mapping related information may be configured only in the RAN and not in the AMF or NSSF. As an example, in consideration of the above, the RAN may transfer the above-described information to the AMF using at least one of the NG setup procedure, the AMF configuration update procedure or the RAN configuration update procedure. In addition, AMF may directly determine the mapping relationship between the slice group ID and S-NSSAI for the terminal based on the above-described information. As another example, the AMF may transfer the above-described information to the NSSF and allow the NSSF to directly determine and reference the mapping relationship between the slice group ID and S-NSSAI for the terminal, and is not limited to a specific embodiment.

As another example, when the base station is configured in a CU and DU structure, the DU may transfer a slice group ID or a value corresponding to a slice group and slice mapping related information to the CU. Thereafter, the CU may transfer the slice group ID or value corresponding to the slice group and slice mapping related information received from the DU to the AMF based on the above-described procedure, and is not limited to a specific embodiment.

As another example, the terminal may transfer capability information related to the network slice group to the network. As an example, the network may configure a slice group with the terminal. As a specific example, the network may configure a slice group with the terminal based on a registration accept message or a terminal configuration command message, but this is not limited to a specific embodiment. Here, the terminal may transfer capability information related to the slice group to the network depending on whether the slice group is supported.

As an example, the terminal may transfer information indicating that slice-based cell reselection or slice-specific RACH procedure may be supported in a specific way related to the slice group to the network through a separate indicator. At this time, as an example, the base station may transfer information about whether the terminal supports the slice group to the AMF based on the RRC message. As another example, information about whether the terminal supports the slice group may be transferred to the AMF through a NAS message, and is not limited to a specific embodiment.

Based on the above, when the AMF obtains a first slice group ID of the terminal and slice mapping related information, mapping information may be allocated based on the slice group for the terminal and the slice list supporting it and transferred to the RAN and the terminal.

Figure 17:
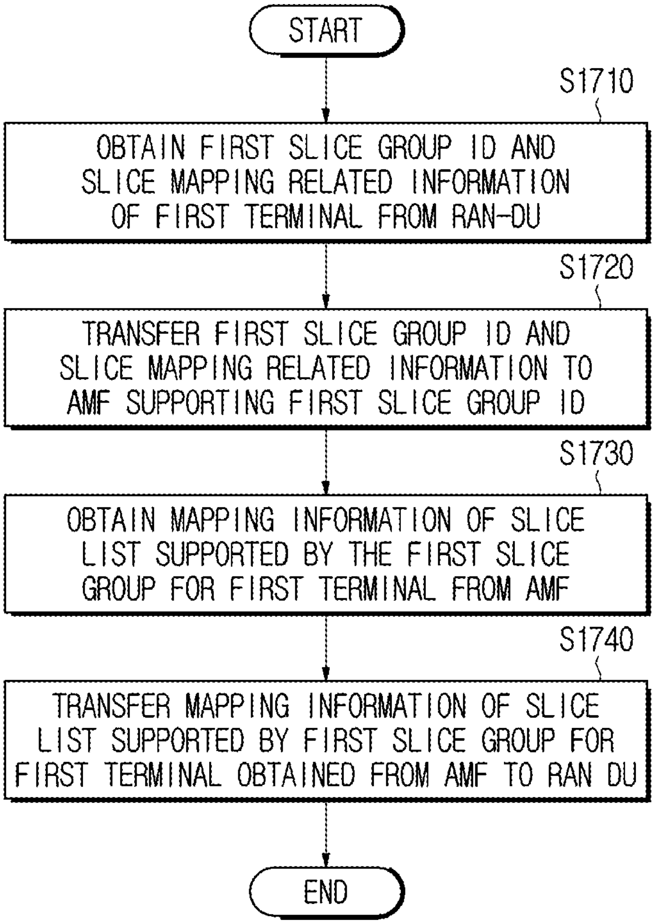
FIG. 17 is a flowchart illustrating a method of operating a base station according to an embodiment of the present disclosure.

FIG. 17 is a flowchart illustrating a method of operating a base station according to an embodiment of the present disclosure.

As described above, the terminal may obtain at least one slice group ID and slice mapping related information and transmit a random access preamble based on a specific slice group ID, which may be shown in FIG. 16. Here, as an example, the base station may operate based on the DU and CU structures described above. As an example, the DU may obtain a first slice group ID of a first terminal and slice mapping related information as a specific terminal. Here, the slice mapping related information may include at least one of a slice group ID, frequency information available in the slice group or priority information of the frequency, as described above. Here, as an example, the network slice group corresponding to the network slice group ID may include a supported network slice list. That is, supported slices may be included in each network slice group.

As an example, the slice list supported for each network slice group may be a network slice list determined for each TAC. As another example, the slice list supported for each network slice group may be a network slice list determined for each PLMN. As another example, the slice list supported for each network slice group may be a network slice list determined for each stand-alone non-public network (SNPN), and is not limited to a specific embodiment.

That is, a slice group may include a supported network slice list, and a slice group ID may be set for each slice group. As an example, the slice group may be a network slice AS group, but may not be limited to the embodiment. Here, the terminal may check the slice group that includes the slice to be used thereby among at least one slice group, and select a first slice group ID corresponding to the slice group. Afterwards, the terminal may transmit a random access preamble corresponding to the first slice group ID, as described above. That is, there may be a random access preamble corresponding to the first slice group ID. Therefore, the base station may recognize the first slice group selected by the terminal through the slice-based random access preamble transmitted by the terminal. Afterwards, the terminal may complete registration in the network based on the random access procedure, which may be as shown in FIG. 15 described above.

Here, as an example, when the RAN-DU obtains the first slice group ID and slice mapping related information of the first terminal, the RAN-DU may transmit the first slice group ID and slice mapping related information of the first terminal to the RAN-CU. That is, the RAN-CU may obtain the first slice group ID and slice mapping related information of the first terminal from the RAN-DU, and select an appropriate AMF based on this. Afterwards, the RAN-CU may transfer the first slice group ID and slice mapping related information of the first terminal to the AMF (S1720). As an example, the RAN-CU may transfer a slice group ID or value corresponding to the slice group and slice mapping related information to the AMF based on an NG setup procedure or RAN configuration update procedure, but may not be limited to this. Afterwards, the AMF may transfer the slice group ID or value corresponding to the slice group and slice mapping related information received from the RAN to the NSSF. The AMF may directly determine the mapping relationship between the slice group ID and S-NSSAI for the terminal based on the above-described information. As another example, the AMF may transfer the above-described information to the NSSF and allow the NSSF to directly determine and reference the mapping relationship between the slice group ID and S-NSSAI for the terminal, and is not limited to a specific embodiment. As another example, the terminal may transfer capability information related to the network slice group to the network. As an example, the network may configure a slice group with the terminal. As a specific example, the network may configure a slice group with the terminal based on a registration accept message or a terminal configuration command message, but this is not limited to a specific embodiment. Here, the terminal may transfer capability information related to the slice group to the network depending on whether the slice group is supported. As an example, the terminal may transfer information indicating that slice-based cell reselection or slice-specific RACH procedure may be supported in a specific way related to the slice group to the network through a separate indicator. At this time, as an example, the base station may transfer information about whether the terminal supports a slice group to the AMF based on the RRC message. As another example, information about whether the terminal supports the slice group may be transferred to the AMF through a NAS message, and is not limited to a specific embodiment.

Based on the above, when the AMF obtains the first slice group ID and slice mapping related information of the first terminal, mapping information may be allocated based on the slice group for the terminal and the slice list supporting it and transferred to the RAN-CU (S1730) Thereafter, the RAN-CU may transfer mapping information about the slice list supported by the first slice group for the first terminal obtained from the AMF to the RAN DU, through which the related information may be transferred to the terminal. Here, as an example, the RAN-CU may generate and transfer a terminal-specific slice group, its frequency band, and priority information while the terminal transitions to the RRC idle state. At this time, the terminal may transition from the RRC idle state back to the RRC connected state and perform cell reselection in consideration of the slice to appropriately select the frequency band, as described above.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered as an illustrative one. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

The embodiments of the present disclosure are applicable to various radio access systems. Examples of the various radio access systems include a 3$^{rd}$ generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THWave communication systems using ultra-high frequency bands.

Additionally: the embodiments of the present disclosure are applicable to various applications such as autonomous vehicles, drones and the like.

The invention claimed is:

1. A method comprising:

receiving, by a centralized unit (CU) from a distributed unit (DU), a first message comprising information related to an identifier (ID) of a slice access stratum (AS) group list of supported slices related to the slice AS group;

transmitting, by the CU to an access and mobility management function (AMF), a second message comprising information related to the ID of the slice AS group and the list of supported slices;

receiving, by the CU from the AMF, a third message comprising information related to a list of single network slice selection assistance information (S-NSSAI) associated with the slice AS group; and transmitting, by the CU to the DU, a fourth message comprising information related to the list of the S-NSSAI.

2. The method of claim 1, wherein the CU obtains from a terminal a first indicator indicating whether the terminal has a capability for supporting the slice AS group and indicates information about whether the terminal has the capability for supporting the slice AS group to the AMF.

3. The method of claim 1, wherein, in case that the CU controls a terminal to transition to a radio resource control (RRC) idle state, the CU transfers at least one of a terminal-specific slice group, frequency information related to the slice AS group or priority information to the terminal.

4. The method of claim 1, wherein the CU is connected to at least one DU.

5. A method comprising:

receiving, by a user equipment (UE), configuration information comprising information related to an identifier (ID) of a slice access stratum (AS) group from a distributed unit (DU);

performing, by the UE, a random access procedure based on a random access channel (RACH) resource related to the ID of the slice AS group; and performing, by the UE, a registration which comprises:

transmitting a registration request message comprising capability information indicating whether the UE supports the slice AS group to an access and mobility management function (AMF); and receiving a registration accept message comprising information related to a list of single network slice selection assistance information (S-NSSAI) associated with the slice AS group from the AMF.

6. A user equipment (UE) comprising:

at least one transceiver;

at least one processor; and at least one memory operably connectable to the at least one processor and storing instructions that, based on being executed by the at least one processor, perform operations comprising:

receiving configuration information comprising information related to an identifier (ID) of a slice access stratum (AS) group from a distributed unit (DU);

performing a random access procedure based on a random access channel (RACH) resource related to the ID of the slice AS group; and performing a registration which comprises:

transmitting a registration request message comprising capability information indicating whether the UE supports the slice AS group to an access and mobility management function (AMF); and receiving a registration accept message comprising information related to a list of single network slice selection assistance information (S-NSSAI) associated with the slice AS group from the AMF.

* * * * *